(12) United States Patent
Nakamura et al.

(10) Patent No.: US 12,157,813 B2
(45) Date of Patent: Dec. 3, 2024

(54) RESIN PARTICLE

(71) Applicant: FUJIFILM Business Innovation Corp., Tokyo (JP)

(72) Inventors: Yukiaki Nakamura, Kanagawa (JP); Masaru Takahashi, Kanagawa (JP); Tomoaki Tanaka, Kanagawa (JP); Satomi Hara, Kanagawa (JP); Ryutaro Kembo, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 368 days.

(21) Appl. No.: 16/919,066

(22) Filed: Jul. 1, 2020

(65) Prior Publication Data

US 2021/0253846 A1 Aug. 19, 2021

(30) Foreign Application Priority Data

Feb. 17, 2020 (JP) .................... 2020-024714

(51) Int. Cl.
| | |
|---|---|
| *C09K 11/06* | (2006.01) |
| *C08L 67/02* | (2006.01) |
| *C09K 11/02* | (2006.01) |
| *C09K 11/07* | (2006.01) |
| *C09D 11/00* | (2014.01) |
| *C09D 11/30* | (2014.01) |

(52) U.S. Cl.
CPC .............. *C08L 67/02* (2013.01); *C09K 11/06* (2013.01); *C08L 2207/53* (2013.01); *C09D 11/00* (2013.01); *C09D 11/30* (2013.01); *C09K 11/02* (2013.01); *C09K 11/025* (2013.01); *C09K 11/07* (2013.01); *C09K 2211/14* (2013.01)

(58) Field of Classification Search
CPC ....... C09K 11/02; C09K 11/025; C09K 11/06; C09K 11/07; G03G 9/08; G03G 9/087; C09D 11/00; C09D 11/30; C08L 2207/53
See application file for complete search history.

(56) References Cited

U.S. PATENT DOCUMENTS

| | | | |
|---|---|---|---|
| 5,194,300 A * | 3/1993 | Cheung ................... B01J 13/20 | 428/407 |
| 6,964,747 B2 * | 11/2005 | Banerjee ................ D06P 1/928 | 264/4.4 |
| 7,597,959 B2 * | 10/2009 | Wang ................... C08F 297/02 | 428/407 |
| 8,652,723 B2 | 2/2014 | Faucher et al. | |
| 10,073,367 B1 * | 9/2018 | Moriya ............... G03G 9/0924 | |
| 11,061,344 B2 | 7/2021 | Sawada et al. | |

(Continued)

FOREIGN PATENT DOCUMENTS

| | | |
|---|---|---|
| CN | 109790234 | 5/2019 |
| JP | S54005733 | 1/1979 |

(Continued)

OTHER PUBLICATIONS

Translation of JP2007154103 from PatentScope (Year: 2007).*

(Continued)

*Primary Examiner* — Hannah J Pak
*Assistant Examiner* — David R. Foss
(74) *Attorney, Agent, or Firm* — JCIPRNET

(57) ABSTRACT

A resin particle includes a fluorescent colorant and a binder resin. The fluorescent colorant is bound to the binder resin by a chemical bond.

17 Claims, 3 Drawing Sheets

1: REDDISH ORANGE
2: GREEN
3: RED
4: ORANGE
5: YELLOW
6: YELLOWISH ORANGE
7: PINK
8: BLUE
9: WHITE
0: ORDINARY COLOR PIGMENT (TYPICAL EXAMPLE)

(56) References Cited

U.S. PATENT DOCUMENTS

| | | | |
|---|---|---|---|
| 11,396,566 B2 | 7/2022 | Harada | |
| 2009/0226833 A1* | 9/2009 | Sato | G03G 9/091 430/105 |
| 2013/0252156 A1* | 9/2013 | Kamiwaki | G03G 9/08755 430/105 |
| 2016/0018300 A1* | 1/2016 | Takanashi | G01N 1/30 435/40.5 |
| 2016/0018404 A1* | 1/2016 | Iyer | B05D 5/06 435/7.1 |

FOREIGN PATENT DOCUMENTS

| | | | |
|---|---|---|---|
| JP | H06175405 | | 6/1994 |
| JP | H06175406 | | 6/1994 |
| JP | H11119472 | | 4/1999 |
| JP | 2000303008 | | 10/2000 |
| JP | 2007083097 | | 4/2007 |
| JP | 2007154103 | A * | 6/2007 |
| JP | 2012042559 | A * | 3/2012 |
| JP | 2012189998 | | 10/2012 |
| JP | 2017-003818 | | 1/2017 |
| JP | 2018180239 | | 11/2018 |
| WO | 2018062522 | | 4/2018 |

OTHER PUBLICATIONS

J.M. Yarborough, Appl. Phys. Lett. 24, 629 (1974); (Year: 1974).*
Machine translation of JP-2012042559-A from Patentscope. (Year: 2012).*
"Office Action of Japan Counterpart Application", issued on Nov. 28, 2023, with English translation thereof, p. 1-p. 8.
"Notice of First Review of China Counterpart Application", with English translation thereof, issued on Sep. 29, 2024, pp. 1-11.

* cited by examiner

RESIN PARTICLE

CROSS-REFERENCE TO RELATED APPLICATIONS

This application is based on and claims priority under 35 USC 119 from Japanese Patent Application No. 2020-024714 filed Feb. 17, 2020.

BACKGROUND

(i) Technical Field

The present disclosure relates to a resin particle.

(ii) Related Art

Resin particles have various applications. One of the applications is a toner in electrophotography. Known toners in the related art are described in, for example, Japanese Unexamined Patent Application Publication Nos. 2017-3818, 11-119472, and 54-5733.

Japanese Unexamined Patent Application Publication No. 2017-3818 discloses a toner including a binder resin and a colorant, in which the colorant contains a color pigment and a fluorescent dye, when a content of the color pigment and a content of the fluorescent dye in the toner are represented by $W_G$ and $W_F$, respectively, on a mass basis, $W_G$ and $W_F$ satisfy a formula (1) below:

$$W_G \times 0.5 > W_F > W_G \times 0.025 \quad (1), \text{ and}$$

when an absorption peak wavelength of the color pigment is represented by PG and an emission peak wavelength of the fluorescent dye is represented by $P_F$, $P_G$ and $P_F$ satisfy a formula (2) below:

$$P_G < P_F \quad (2).$$

Japanese Unexamined Patent Application Publication No. 11-119472 discloses a negatively charged magenta toner for electrophotography, the magenta toner being obtained by kneading a binder resin and other optional toner materials with a magenta-based colorant prepared by heat-kneading a Rhodamine dye and a high acid-value resin.

Japanese Unexamined Patent Application Publication No. 54-5733 discloses a color toner including, as a colorant, a mixed heat-treated product of a basic dye and a resin having an acid value of 5 to 120 in a binder resin.

SUMMARY

Aspects of non-limiting embodiments of the present disclosure relate to resin particles that provide an image having a high fluorescence intensity compared with a case where a fluorescent colorant is simply dispersed in a binder resin without a chemical bond or molecular dispersion.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a resin particle including a fluorescent colorant and a binder resin, in which the fluorescent colorant is bound to the binder resin by a chemical bond.

BRIEF DESCRIPTION OF THE DRAWINGS

Exemplary embodiments of the present disclosure will be described in detail based on the following figures, wherein.

DETAILED DESCRIPTION

Figure 1:
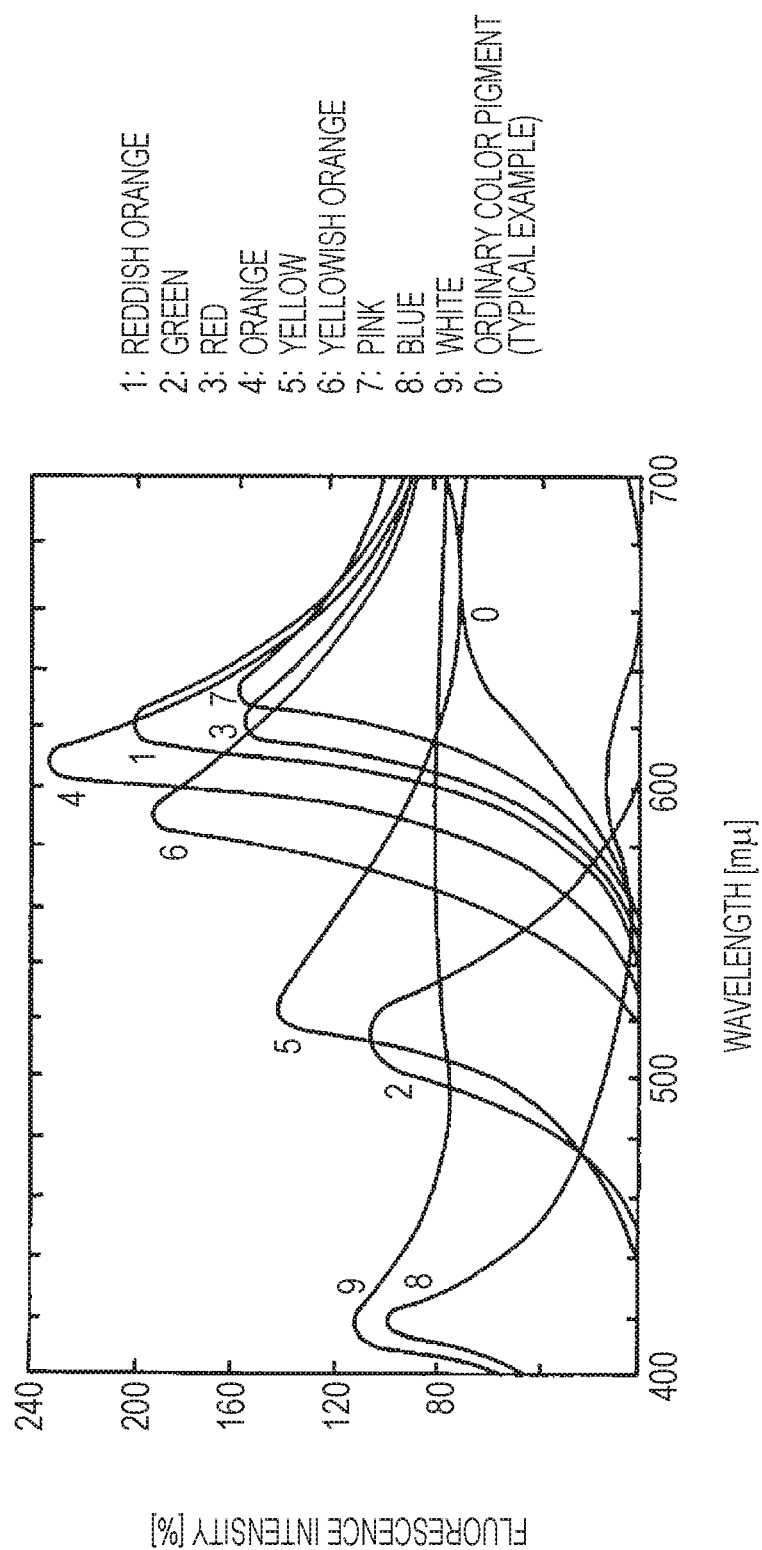
FIG. 1 is a graph substituted for a drawing and showing fluorescence spectra.

In the present specification, if two or more substances corresponding to one component are present in a composition, the amount of the component in the composition refers to the total amount of the two or more substances present in the composition, unless otherwise stated.

In the present specification, a "toner for electrostatic image development" may be simply referred to as a "toner", and an "electrostatic image developer" may be simply referred to as a "developer".

Exemplary embodiments of the present disclosure will now be described.

Resin Particle

A first exemplary embodiment of the resin particle according to the present exemplary embodiment provides a resin particle including a fluorescent colorant and a binder resin, in which the fluorescent colorant is bound to the binder resin by a chemical bond.

A second exemplary embodiment of the resin particle according to the present exemplary embodiment provides a resin particle including a fluorescent colorant and a binder resin, in which the fluorescent colorant is molecularly dispersed in the binder resin.

Recently, in digital printing, printers for use in commercial printing, publishing, and paper packaging fields, and printer models that appeal spot color toners have been introduced in the market from various manufacturers. With regard to fluorescent colors, various colors ranging from a color having a strong sense of fluorescence to a pale color are often selected by using, as in usual spot colors, color sample books or color chips such as Neons Guide available from PANTONE LLC, DIC Color Guide available from DIC Corporation, and COLOR FINDER available from Toyo Ink Co., Ltd. However, fluorescent colorants have properties called concentration quenching and self-quenching. Specifically, at a high concentration of a fluorescent colorant, the fluorescence intensity decreases and the proportional relation between the concentration and the intensity is not satisfied. Presumably, such a phenomenon is caused by the interaction between fluorescent molecules, and the following phenomena are considered to occur. For example, fluorescence once emitted is reabsorbed by another molecule, and energy transfer occurs between adjacent molecules and, consequently, all the original energy is not released to the outside.

Due to the configurations described above, the resin particles according to the present exemplary embodiment are capable of forming an image having a high fluorescence intensity. The reason for this is unclear but is presumably as follows.

A resin particle in which a fluorescent colorant is bound to a binder resin by a chemical bond or a resin particle in which a fluorescent colorant is molecularly dispersed in a binder resin suppresses concentration quenching and self-quenching, that is, suppresses the phenomenon in which fluorescence once emitted is reabsorbed by another molecule and the phenomenon in which energy transfer occurs between adjacent molecules and, consequently, all the original energy is not released to the outside. Accordingly, an image to be formed has a high fluorescence intensity.

Resin particles according to the exemplary embodiment will be described in detail.

In the present specification, the term "resin particle according to the exemplary embodiment" or "resin particle" encompasses the resin particles in both the first exemplary embodiment and the second exemplary embodiment, unless otherwise specified.

A resin particle according to the exemplary embodiment is a resin particle in which a fluorescent colorant is bound to a binder resin by a chemical bond or a resin particle in which a fluorescent colorant is molecularly dispersed in a binder resin. The resin particle includes, as needed, a colorant other than the fluorescent colorant, a release agent, and other additives and may include a binder resin, a fluorescent colorant, another colorant, and a release agent.

From the viewpoint of fluorescence intensity and graininess of images, the resin particle may be a resin particle in which a fluorescent colorant is molecularly dispersed in a binder resin by a chemical bond.

In the first exemplary embodiment of the resin particle according to the exemplary embodiment, the resin particle is a resin particle in which a fluorescent colorant is bound to a binder resin by a chemical bond.

Example of the chemical bond include an ionic bond, a covalent bond, a hydrogen bond, and a bond due to the dipole interaction (van der Waals bond).

From the viewpoint of fluorescence intensity, of these, at least one bond selected from the group consisting of an ionic bond, a covalent bond, and a hydrogen bond is preferred, at least one bond selected from the group consisting of an ionic bond and a hydrogen bond is more preferred, and an ionic bond is particularly preferred.

In the case where the fluorescent colorant is bound to the binder resin by an ionic bond, from the viewpoint of fluorescence intensity and graininess of images, the binder resin may have an anionic group and the fluorescent colorant may have a cationic group, and from the viewpoint of fluorescence intensity and rub resistance, the binder resin may have a cationic group and the fluorescent colorant may have an anionic group. When the binder resin has a cationic group, it is expected that a fixed image is bound to an anionic group such as a carboxy group and a hydroxy group of cellulose included in a sheet to improve the image strength.

With regard to graininess, for example, in the case where an anionic resin is used as the binder resin and a cationic dye is used as the fluorescent colorant, the resin particles are anionic as a whole because the number of functional groups of the anionic resin is larger than that of the cationic dye. An external additive described later is also anionically charged, the charge imbalance is small as a whole, scattering of dots during transfer is reduced, and dots having a good appearance are maintained. Accordingly, further improved graininess is achieved.

In the case where a cationic resin is used as the binder resin and an anionic dye is used as the fluorescent colorant, contrary to the above case, the resin particles are cationic as a whole. Since an external additive described later is anionically charged, resin particles with large charge imbalance tend to be generated as scattered dots during transfer. Accordingly, graininess is often slightly inferior to that in the above case.

Regarding the rub resistance, for example, fibers of a sheet used as a recording medium are mainly composed of cellulose, and the surface of the sheet has hydroxy groups and is negatively charged.

The resin particles are melted by heat during fixing and penetrate fibers of paper, and irregularities of a bonding surface are caught like an anchor to thereby physically bond to the resin particles. This is referred to as an anchoring effect.

In the case where an anionic resin is used as the binder resin and a cationic dye is used as the fluorescent colorant, the resin particles are anionic as a whole, electrically repel the anionic property of the sheet, and are fixed to the sheet only by the anchoring effect. On the other hand, in the case where a cationic resin is used as the binder resin and an anionic dye is used as the fluorescent colorant, the resin particles are cationic as a whole, electrically coupled with the anionic property of the sheet, and are fixed to the sheet not only by the anchoring effect but also by an ionic bond. Accordingly, the image strength (such as rub strength and rub resistance) improves.

From the viewpoint of fluorescence intensity and graininess of images, a value of (molar amount of ionic groups of binder resin included in resin particle)/(molar amount of ionic groups of fluorescent colorant included in resin particle) is preferably 1 or more, more preferably 1.5 or more, still more preferably 2 or more, and particularly preferably 2 or more and 10 or less.

In the first exemplary embodiment of the resin particle according to the exemplary embodiment, based on the total mass of the fluorescent colorant included in the resin particles, 50% by mass or more of the fluorescent colorant is preferably bound to the binder resin by a chemical bond, 80% by mass or more of the fluorescent colorant is more preferably bound to the binder resin by a chemical bond, 90% by mass or more of the fluorescent colorant is still more preferably bound to the binder resin by a chemical bond, and all the fluorescent colorant is particularly preferably bound to the binder resin by a chemical bond from the viewpoint of fluorescence intensity and graininess of images.

Chemical bonding of the fluorescent colorant in the resin particles to the binder resin is confirmed by the following methods.

The confirmation can be performed by, for example, Fourier transform infrared spectroscopy (FT-IR), ultraviolet-visible spectroscopy (UV-vis spectrum), nuclear magnetic resonance spectroscopy (NMR), or gas chromatography-mass spectrometry (GC-MS).

In the second exemplary embodiment of the resin particle according to the exemplary embodiment, the resin particle is a resin particle in which a fluorescent colorant is molecularly dispersed in a binder resin.

The expression "molecularly dispersed" in the exemplary embodiment means that molecules of a fluorescent colorant are dispersed not in the form of an aggregate (association) of two or more molecules, for example, in the form of a fluorescent colorant particle but in a monomolecular state (monomolecular dispersion). However, in the exemplary embodiment, a resin particle in which a fluorescent colorant is bound to a binder resin by a chemical bond in a monomolecular state is also encompassed by the monomolecular dispersion.

In the first exemplary embodiment of the resin particle according to the exemplary embodiment, from the viewpoint of fluorescence intensity and graininess of images, the resin particle may be a resin particle in which a fluorescent colorant is molecularly dispersed in a binder resin by a chemical bond.

Examples of a method for molecularly dispersing a fluorescent colorant in a binder resin in the exemplary embodiment include, but are not particularly limited to, a method including binding a fluorescent colorant to a binder resin by a chemical bond, a method in which a fluorescent dye that is soluble or compatible with a binder resin is dissolved in or compatibilized with the binder resin, and a method including dissolving a fluorescent colorant and a binder resin in a solvent to prepare a solution and removing the solvent from the solution. Of these, the method including binding a fluorescent colorant to a binder resin by a chemical bond is preferred.

In the second exemplary embodiment of the resin particle according to the exemplary embodiment, based on the total mass of the fluorescent colorant included in the resin particles, 50% by mass or more of the fluorescent colorant is preferably molecularly dispersed in the binder resin, 80% by mass or more of the fluorescent colorant is more preferably molecularly dispersed in the binder resin, 90% by mass or more of the fluorescent colorant is still more preferably molecularly dispersed in the binder resin, and all the fluorescent colorant is particularly preferably molecularly dispersed in the binder resin from the viewpoint of fluorescence intensity and graininess of images.

Molecular dispersion of the fluorescent colorant in the resin particles in the binder resin is confirmed by the following methods.

When an insoluble residue of the fluorescent colorant is present, the residue is observed as a very small aggregate (lump). Accordingly, unless such an aggregate (lump) of a dye fluorescent colorant is observed, the fluorescent colorant is considered to be in the molecular dispersion state. The presence of the lump is confirmed by observing a cross section with a TEM or performing filtering with a filter when the fluorescent colorant is dissolved.

A method for producing resin particles according to the exemplary embodiment is preferably a method using at least resin particles having surfaces to which a fluorescent colorant is ionically bonded, and more preferably a method including a step of preparing resin particles by, in an aggregation-coalescence method, aggregating and coalescing at least resin particles having surfaces to which a fluorescent colorant is ionically bonded.

Furthermore, from the viewpoint of fluorescence intensity and graininess of images, the resin particle according to the exemplary embodiment is preferably a particle obtained by at least aggregating resin particles in which a fluorescent colorant is bound to a binder resin by a chemical bond, and more preferably a particle obtained by at least aggregating resin particles in which a fluorescent colorant is bound to a binder resin by an ionic bond.

Fluorescent Colorant

The fluorescent colorant is a colorant that exhibits fluorescence and preferably a colorant that exhibits fluorescence in the visible light region (wavelength: 380 nm or more and 760 nm or less). The light that excites the fluorescent colorant is not particularly limited, but preferably includes at least visible light or ultraviolet light and more preferably includes at least ultraviolet light.

Furthermore, from the viewpoint of the ease of dispersion and the chemical bond to the binder resin, the fluorescent colorant may be a fluorescent dye.

In the exemplary embodiment, the term "pigment" refers to a colorant having a solubility in 100 g of water at 23° C. of less than 0.1 g and having a solubility in 100 g of cyclohexanone at 23° C. of less than 0.1 g, and the term "dye" refers to a colorant having a solubility in 100 g of water at 23° C. of 0.1 g or more and having a solubility in 100 g of cyclohexanone at 23° C. of 0.1 g or more.

From the viewpoint of the ease of dispersion and the chemical bond to the binder resin, the fluorescent colorant preferably has a group capable of forming a chemical bond, more preferably has an ionic group, and particularly preferably has a cationic group or an anionic group.

From the viewpoint of fluorescence intensity and graininess of images, the cationic group is preferably an onium group, more preferably an ammonium group, an iminium group, or a pyridinium group, still more preferably an ammonium group, and particularly preferably a quaternary ammonium group.

The fluorescent colorant may have only one ionic group or two or more ionic groups. From the viewpoint of fluorescence intensity and graininess of images, the fluorescent colorant preferably has one or more and four or less of ionic groups, more preferably has one or two ionic groups, and particularly preferably has only one ionic group.

From the viewpoint of fluorescence intensity and graininess of images, the fluorescent colorant preferably has, as the anionic group, at least one group selected from the group consisting of acid groups and salts thereof, more preferably has at least one group selected from the group consisting of a sulfo group, a carboxy group, and salts thereof, and particularly preferably has at least one group selected from the group consisting of a sulfo group and salts thereof.

In the case where the fluorescent colorant forms a chemical bond to the binder resin, the anionic group is, for example, preferably $-SO_3^-$ and $-COO^-$ and more preferably $-SO_3^-$. The color of the fluorescent colorant is not particularly limited and may be appropriately selected according to the intended purpose.

Examples of the fluorescent colorant include a fluorescent pink colorant, a fluorescent red colorant, a fluorescent orange colorant, a fluorescent yellow colorant, a fluorescent green colorant, and a fluorescent purple colorant.

Of these, a fluorescent pink colorant, a fluorescent red colorant, a fluorescent orange colorant, a fluorescent yellow colorant, or a fluorescent green colorant is preferred, a fluorescent pink colorant, a fluorescent yellow colorant, or a fluorescent green colorant is more preferred, and a fluorescent pink colorant is particularly preferred.

The resin particle according to the exemplary embodiment is preferably a fluorescent color resin particle, more preferably a fluorescent pink resin particle, a fluorescent yellow resin particle, or a fluorescent green resin particle, and particularly preferably a fluorescent pink resin particle.

The fluorescence peak wavelength (maximum fluorescence wavelength) in the spectral reflectance of the fluorescent colorant can be appropriately selected according to the desired color. For example, when a fluorescent pink is desired to be expressed as a color, the fluorescent colorant preferably has a fluorescence peak wavelength at 560 nm or more and 670 nm or less, and more preferably at 580 nm or more and 650 nm or less.

FIG. 1 shows an example of the spectrum of each fluorescent color. In FIG. 1, the vertical axis represents the fluorescence intensity, and the horizontal axis represents the wavelength. Note that the unit "mu" is equal to "nm".

From the viewpoint of graininess of images, the fluorescent colorant preferably has, at the fluorescence peak wavelength, a value of the spectral reflectance of 100% or more, more preferably 105% or more, and particularly preferably 110% or more.

The fluorescent colorant used may be a publicly known fluorescent colorant. Specific examples thereof include Basic Red 1 (Rhodamine 6G), Basic Red 1:1, Basic Red 2, Basic Red 12, Basic Red 13, Basic Red 14, Basic Red 15, Basic Red 36, Basic Violet 7, Basic Violet 10 (Rhodamine B), Basic Violet 11 (Rhodamine 3B), Basic Violet 11:1 (Rhodamine A), Basic Violet 15, Basic Violet 16, Basic Violet 27, Pigment Yellow 101, Basic Yellow 1, Basic Yellow 2, Basic Yellow 9, Basic Yellow 24, Basic Yellow 40, Basic Orange 15, Basic Orange 22, Basic Blue 1, Basic Blue 3, Basic Blue 7, Basic Blue 9, Basic Blue 45, Basic Green 1, Acid Yellow 3, Acid Yellow 7, Acid Yellow 73, Acid Yellow 87, Acid Yellow 184, Acid Yellow 245, Acid Yellow 250, Acid Red 51, Acid Red 52, Acid Red 57, Acid Red 77, Acid Red 87, Acid Red 89, Acid Red 92, Acid Blue 9, Acid Black 2, Solvent Yellow 43, Solvent Yellow 44, Solvent Yellow 85, Solvent Yellow 98, Solvent Yellow 116, Solvent Yellow 131, Solvent Yellow 145, Solvent Yellow 160:1, Solvent Yellow 172, Solvent Yellow 185, Solvent Yellow 195, Solvent Yellow 196, Solvent Orange 63, Solvent Orange 112, Solvent Red 49, Solvent Red 149, Solvent Red 175, Solvent Red 196, Solvent Red 197, Solvent Blue 5, Solvent Green 5, Solvent Green 7, Direct Yellow 27, Direct Yellow 85, Direct Yellow 96, Direct Orange 8, Direct Red 2, Direct Red 9, Direct Blue 22, Direct Blue 199, Direct Green 6, Disperse Yellow 11, Disperse Yellow 82, Disperse Yellow 139, Disperse Yellow 184, Disperse Yellow 186, Disperse Yellow 199, Disperse Yellow 202, Disperse Yellow 232, Disperse Orange 11, Disperse Orange 32, Disperse Red 58, Disperse Red 274, Disperse Red 277, Disperse Red 303, Disperse Blue 7, Reactive Yellow 78, and Vat Red 41.

One or two or more of these fluorescent colorants are selected according to the desired color. For example, in the case where a fluorescent pink is desired to be expressed, preferred is at least one fluorescent colorant selected from the group consisting of Basic Red 1 (Rhodamine 6G), Basic Red 1:1, Basic Red 2, Basic Red 12, Basic Red 13, Basic Red 14, Basic Red 15, Basic Red 36, Basic Violet 7, Basic Violet 10 (Rhodamine B), Basic Violet 11 (Rhodamine 3B), Basic Violet 11:1 (Rhodamine A), Basic Violet 15, Basic Violet 16, and Basic Violet 27.

From the viewpoint of fluorescence intensity and graininess of images, the fluorescent colorant preferably includes a fluorescent colorant having a xanthene structure, a naphthalene structure, or a triarylmethane structure and more preferably includes a fluorescent colorant having a xanthene structure.

The xanthene structure is preferably a rhodamine structure, a fluorescein structure, or an eosin structure and more preferably a rhodamine structure.

From the viewpoint of fluorescence intensity and graininess of images, examples of the fluorescent colorant having a cationic group preferably include Basic Red 1 (Rhodamine 6G), Basic Red 1:1, Basic Red 2, Basic Red 12, Basic Red 13, Basic Red 14, Basic Red 15, Basic Red 36, Basic Violet 7, Basic Violet 10 (Rhodamine B), Basic Violet 11 (Rhodamine 3B), Basic Violet 11:1 (Rhodamine A), Basic Violet 15, Basic Violet 16, Basic Violet 27, Basic Yellow 1, Basic Yellow 2, Basic Yellow 9, Basic Yellow 24, Basic Yellow 40, Basic Orange 15, Basic Orange 22, Basic Blue 1, Basic Blue 3, Basic Blue 7, Basic Blue 9, and Basic Blue 45, Basic Green 1; and more preferably include Basic Red 1 (Rhodamine 6G), Basic Red 1:1, Basic Red 2, Basic Red 12, Basic Red 13, Basic Red 14, Basic Red 15, Basic Red 36, Basic Violet 7, Basic Violet 10 (Rhodamine B), Basic Violet 11 (Rhodamine 3B), Basic Violet 11:1 (Rhodamine A), Basic Violet 15, Basic Violet 16, and Basic Violet 27.

From the viewpoint of fluorescence intensity and graininess of images, examples of the fluorescent colorant having an anionic group preferably include Acid Yellow 3, Acid Yellow 7, Acid Yellow 73, Acid Yellow 87, Acid Yellow 184, Acid Yellow 245, Acid Yellow 250, Acid Red 51, Acid Red 52, Acid Red 57, Acid Red 77, Acid Red 87, Acid Red 89, Acid Red 92, Acid Blue 9, and Acid Black 2; and more preferably include Acid Red 51, Acid Red 52, Acid Red 57, Acid Red 77, Acid Red 87, Acid Red 89, and Acid Red 92.

The resin particles may include one fluorescent colorant alone or two or more fluorescent colorants in combination.

From the viewpoint of fluorescence intensity and graininess of images, the content of the fluorescent colorant is preferably 0.2% by mass or more and 5% by mass or less, more preferably 0.2% by mass or more and 3% by mass or less, and particularly preferably 0.2% by mass or more and 2% by less or less based on the total mass of the resin particles.

Binder Resin

Examples of the binder resin include vinyl resins made of homopolymers of monomers such as styrenes (for example, styrene, p-chlorostyrene, and α-methylstyrene), (meth) acrylic acid esters (for example, methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate), ethylenically unsaturated nitriles (for example, acrylonitrile and methacrylonitrile), vinyl ethers (for example, vinyl methyl ether and vinyl isobutyl ether), vinyl ketones (for example, vinyl methyl ketone, vinyl ethyl ketone, and vinyl isopropenyl ketone), and olefins (for example, ethylene, propylene, and butadiene); and vinyl resins made of copolymers of combinations of two or more of the above monomers.

Examples of the binder resin further include non-vinyl resins such as epoxy resins, polyester resins, polyurethane resins, polyamide resins, cellulose resins, polyether resins, and modified rosins; mixtures of these non-vinyl resins and the above vinyl resins; and graft polymers obtained by polymerizing a vinyl monomer in the presence of any of these resins.

Of these, styrene-acrylic copolymers or polyester resins are suitably used, and polyester resins are more suitably used.

These binder resins may be used alone or in combination of two or more thereof.

The glass transition temperature of the binder resin is preferably 90° C. or lower, more preferably 80° C. or lower, and particularly preferably 50° C. or higher and 80° C. or lower.

From the viewpoint of fluorescence intensity and graininess of images, the binder resin preferably has an ionic group and more preferably has a cationic group or an anionic group.

From the viewpoint of fluorescence intensity and graininess of images, the cationic group is preferably an amino group or an ammonium group.

From the viewpoint of fluorescence intensity and graininess of images, the anionic group is preferably a carboxy group, a sulfo group, or a salt of any of these, and more preferably a carboxy group or a salt thereof.

From the viewpoint of fluorescence intensity and rub resistance of images, in particular, the resin having a cationic group preferably includes a styrene-acrylic copolymer having an amino group, and more preferably includes a styrene-acrylic copolymer having a structural unit with an amino group.

From the viewpoint of fluorescence intensity and graininess of images, the resin having an anionic group preferably includes a polyester resin having at least one group selected from the group consisting of a carboxy group and salts thereof or a styrene-acrylic resin having at least one group selected from the group consisting of a carboxy group and salts thereof, and more preferably includes a polyester resin having at least one group selected from the group consisting of a carboxy group and salts thereof.

The binder resin may be an amorphous (also referred to as "non-crystalline") resin or a crystalline resin.

From the viewpoint of properties of suppressing density unevenness in an image to be obtained, the binder resin preferably includes a crystalline resin and more preferably includes an amorphous resin and a crystalline resin.

The content of the crystalline resin is preferably 2% by mass or more and 40% by mass or less, and more preferably 2% by mass or more and 20% by mass or less based on the total mass of the binder resin.

The "crystallinity" of a resin refers to, in differential scanning calorimetry (DSC), having a clear endothermic peak instead of a stepwise change in an amount of heat absorption, and specifically means that a half width of an endothermic peak is within 10° C. when measuring is performed at a temperature-increasing rate of 10 (° C./min).

On the other hand, the "amorphousness" of a resin means that the half width exceeds 10° C., that a stepwise change in an amount of heat absorption is exhibited, or that no clear endothermic peak is observed.

Polyester Resin

Examples of the polyester resin include publicly known polyester resins.

Amorphous Polyester Resin

The amorphous polyester resin is, for example, a polycondensation product of a polycarboxylic acid and a polyhydric alcohol. The amorphous polyester resin used may be a commercial product or a synthesized product.

Examples of the polycarboxylic acid include aliphatic dicarboxylic acids (such as oxalic acid, malonic acid, maleic acid, fumaric acid, citraconic acid, itaconic acid, glutaconic acid, succinic acid, alkenyl succinic acids, adipic acid, and sebacic acid), alicyclic dicarboxylic acids (such as cyclohexanedicarboxylic acid), aromatic dicarboxylic acids (such as terephthalic acid, isophthalic acid, phthalic acid, and naphthalenedicarboxylic acid), anhydrides thereof, and lower alkyl esters (having, for example, 1 to 5 carbon atoms) thereof. In particular, the polycarboxylic acid is preferably, for example, an aromatic dicarboxylic acid.

A trivalent or higher carboxylic acid having a crosslinked or branched structure may be used as the polycarboxylic acid in combination with a dicarboxylic acid. Examples of the trivalent or higher carboxylic acid include trimellitic acid, pyromellitic acid, anhydrides thereof, and lower alkyl esters (having, for example, 1 to 5 carbon atoms) thereof.

These polycarboxylic acids may be used alone or in combination of two or more thereof.

Examples of the polyhydric alcohol include aliphatic diols (such as ethylene glycol, diethylene glycol, triethylene glycol, propylene glycol, butanediol, hexanediol, and neopentyl glycol), alicyclic diols (such as cyclohexanediol, cyclohexanedimethanol, and hydrogenated bisphenol A), and aromatic diols (such as an ethylene oxide adduct of bisphenol A and a propylene oxide adduct of bisphenol A). In particular, the polyhydric alcohol is, for example, preferably an aromatic diol or an alicyclic diol and more preferably an aromatic diol.

A trivalent or higher polyhydric alcohol having a crosslinked or branched structure may be used, as the polyhydric alcohol, in combination with a diol. Examples of the trivalent or higher polyhydric alcohol include glycerin, trimethylolpropane, and pentaerythritol.

These polyhydric alcohols may be used alone or in combination or two or more thereof.

The glass transition temperature (Tg) of the amorphous polyester resin is preferably 50° C. or higher and 80° C. or lower, and more preferably 50° C. or higher and 65° C. or lower.

The glass transition temperature is determined from a differential scanning calorimetry (DSC) curve obtained by DSC. More specifically, the glass transition temperature is determined from the "extrapolated glass transition onset temperature" described in glass transition temperature determination methods in "Testing methods for transition temperatures of plastics" in JIS K 7121-1987.

The weight-average molecular weight (Mw) of the amorphous polyester resin is preferably 5,000 or more and 1,000,000 or less, and more preferably 7,000 or more and 500,000 or less.

The number-average molecular weight (Mn) of the amorphous polyester resin is preferably 2,000 or more and 100,000 or less.

The molecular weight distribution Mw/Mn of the amorphous polyester resin is preferably 1.5 or more and 100 or less, and more preferably 2 or more and 60 or less.

The weight-average molecular weight and the number-average molecular weight are measured by gel permeation chromatography (GPC). The molecular weight measurement by GPC is performed by using a GPC measurement apparatus HLC-8120GPC manufactured by TOSOH Corporation and using a TSKgel SuperHM-M (15 cm) column manufactured by TOSOH Corporation and a tetrahydrofuran (THF) solvent. The weight-average molecular weight and the number-average molecular weight are calculated from the measurement results by using a molecular-weight calibration curve prepared with monodispersed polystyrene standard samples.

The amorphous polyester resin is obtained by a well-known production method. Specifically, the amorphous polyester resin is obtained by, for example, a method including setting a polymerization temperature to 180° C. or higher and 230° C. or lower, reducing the pressure inside the reaction system, as necessary, and allowing the reaction to proceed while water and alcohol generated during condensation are removed.

If raw material monomers do not dissolve or are not compatible with each other at the reaction temperature, a solvent having a high boiling point may be added as a solubilizer to dissolve the monomers. In such a case, the polycondensation reaction is performed while the solubilizer is distilled off. When a monomer with poor compatibility is present, the monomer with poor compatibility and an acid or alcohol to be polycondensed with the monomer may be condensed in advance and the resulting condensed product and the remaining components may then be subjected to polycondensation.

Crystalline Polyester Resin

The crystalline polyester resin is, for example, a polycondensation product of a polycarboxylic acid and a polyhydric alcohol. The crystalline polyester resin used may be a commercial product or a synthesized product.

In order to easily form a crystalline structure, the crystalline polyester resin is preferably a polycondensation product obtained by using polymerizable monomers having a linear aliphatic structure rather than polymerizable monomers having an aromatic structure.

Examples of the polycarboxylic acid include aliphatic dicarboxylic acids (such as oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid), aromatic dicarboxylic acids (such as dibasic acids, e.g., phthalic acid, isophthalic acid, terephthalic acid, and naphthalene-2,6-dicarboxylic acid), anhydrides thereof, and lower alkyl esters (having, for example, 1 to 5 carbon atoms) thereof.

A trivalent or higher carboxylic acid having a crosslinked or branched structure may be used as the polycarboxylic acid in combination with a dicarboxylic acid. Examples of the trivalent carboxylic acid include aromatic carboxylic acids (such as 1, 2, 3-benzenetricarboxylic acid, 1,2,4-benzenetricarboxylic acid, and 1,2,4-naphthalenetricarboxylic acid), anhydrides thereof, and lower alkyl esters (having, for example, 1 to 5 carbon atoms) thereof.

A dicarboxylic acid having a sulfonic group or a dicarboxylic acid having an ethylenic double bond may be used as the polycarboxylic acid in combination with any of the above dicarboxylic acids.

These polycarboxylic acids may be used alone or in combination of two or more thereof.

Examples of the polyhydric alcohol include aliphatic diols (e.g., linear aliphatic diols having a main chain with 7 to 20 carbon atoms). Examples of the aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosanedecanediol. In particular, the aliphatic diol is preferably 1,8-octanediol, 1,9-nonanediol, or 1,10-decanediol.

A trivalent or higher alcohol having a crosslinked or branched structure may be used as the polyhydric alcohol in combination with a diol. Examples of the trivalent or higher alcohol include glycerin, trimethylolethane, trimethylolpropane, and pentaerythritol.

These polyhydric alcohols may be used alone or in combination of two or more thereof.

The content of the aliphatic diol in the polyhydric alcohol may be 80% by mole or more and is preferably 90% by mole or more.

The melting temperature of the crystalline polyester resin is preferably 50° C. or higher and 100° C. or lower, more preferably 55° C. or higher and 90° C. or lower, and still more preferably 60° C. or higher and 85° C. or lower.

The melting temperature is determined by using a differential scanning calorimetry (DSC) curve obtained by DSC from the "melting peak temperature" described in melting temperature determination methods in "Testing methods for transition temperatures of plastics" in JIS K 7121-1987.

The weight-average molecular weight (Mw) of the crystalline polyester resin may be 6,000 or more and 35,000 or less.

The crystalline polyester resin is obtained by, for example, a well-known production method as in the amorphous polyester.

From the viewpoint of rub resistance of images, the weight-average molecular weight (Mw) of the binder resin is preferably 5,000 or more and 1,000,000 or less, more preferably 7,000 or more and 500,000 or less, and particularly preferably 25,000 or more and 60,000 or less. The number-average molecular weight (Mn) of the binder resin is preferably 2,000 or more and 100,000 or less. The molecular weight distribution Mw/Mn of the binder resin is preferably 1.5 or more and 100 or less, and more preferably 2 or more and 60 or less.

The weight-average molecular weight and the number-average molecular weight of the binder resin are measured by gel permeation chromatography (GPC). The molecular weight measurement by GPC is performed by using a GPC measurement apparatus HLC-8120GPC manufactured by TOSOH Corporation and using a TSKgel SuperHM-M (15 cm) column manufactured by TOSOH Corporation and a tetrahydrofuran (THF) solvent. The weight-average molecular weight and the number-average molecular weight are calculated from the measurement results by using a molecular-weight calibration curve prepared with monodispersed polystyrene standard samples.

The content of the binder resin is preferably 40% by mass or more and 95% by mass or less, more preferably 50% by mass or more and 90% by mass or less, and still more preferably 60% by mass or more and 85% by mass or less based on the total mass of the resin particles.

Colorant Other than the Fluorescent Colorant

Another colorant is a colorant other than the fluorescent colorant described above, and a publicly known colorant can be used.

The other colorant may be a colorant that does not exhibit fluorescence in the visible light region.

The other colorant may be a pigment or a dye and is preferably a pigment.

Specific examples of the other colorant include magenta pigments such as C.I. Pigment Red 1, 2, 3, 4, 5, 6, 7, 8, 9, 10, 11, 12, 14, 15, 16, 17, 18, 21, 22, 23, 31, 32, 38, 41, 48, 48:1, 48:2, 48:3, 48:4, 49, 52, 53:1, 54, 57:1, 58, 60:1, 63, 64:1, 68, 81:1, 81:4, 83, 88, 89, 112, 114, 122, 123, 144, 146, 149, 150, 166, 170, 176, 177, 178, 179, 184, 185, 187, 202, 206, 207, 208, 209, 210, 220, 221, 238, 242, 245, 253, 254, 255, 256, 258, 264, 266, 269, and 282, and Pigment Violet 19; magenta dyes such as C.I. Solvent Red 1, 3, 8, 23, 24, 25, 27, 30, 49, 52, 58, 63, 81, 82, 83, 84, 100, 109, 111, 121, and 122, C.I. Disperse Red 9, and C.I. Basic Red 1, 2, 9, 12, 13, 14, 15, 17, 18, 22, 23, 24, 27, 29, 32, 34, 35, 36, 37, 38, 39, and 40; and various pigments such as red iron oxide, cadmium red, red lead, mercury sulfide, Permanent Red 4R, Lithol Red, Pyrazolone Red, Watching Red, a calcium salt, Lake Red D, Brilliant Carmine 6B, Eosin Lake, Rhodamine Lake B, Alizarin Lake, Brilliant Carmine 3B, carbon black, Chromium Yellow, Hansa Yellow, Benzidine Yellow, Threne Yellow, Quinoline Yellow, Pigment Yellow, Permanent Orange GTR, Pyrazolone Orange, Vulcan Orange, Brilliant Carmine 3B, Brilliant Carmine 6B, DuPont Oil Red, Lake Red C, Aniline Blue, Ultramarine Blue, Calco Oil Blue, Methylene Blue Chloride, Phthalocyanine Blue, Pigment Blue, Phthalocyanine Green, and Malachite Green Oxalate; and various dyes. Furthermore, solid solution pigments (pigments obtained by forming a solid solution of two or more pigments to change the crystal structure) are also suitable. Specifically, examples thereof include combinations of quinacridones having different substituents (such as unsubstituted quinacridone PV19 and PR122, and PV19 and PR202).

The other colorant is, appropriately selected according to the desired color. For example, when a fluorescent pink is desired to be expressed, a magenta pigment is included in one example. In particular, a solid solution pigment is suitable. As for a fluorescent color, a good performance is achieved when a bright color can be expressed, or a deep color can be expressed in the same color tone. The use of a solid solution pigment tends to enhance the performance.

The other colorants may be used alone or in combination of two or more thereof.

The other colorant used may be optionally subjected to a surface treatment. The other colorant may be used in combination with a dispersant. Furthermore, two or more colorants may be used in combination.

From the viewpoint of fluorescence intensity and graininess of images, the content of the other colorant is preferably 2% by mass or less, more preferably 1.5% by mass or less, and particularly preferably 1% by mass or less based on the total mass of the resin particles.

From the viewpoint of fluorescence intensity and graininess of images, a ratio (WB/WA) of the other colorant content WB to the fluorescent colorant content WA in the resin particles is preferably 1.25 or less, more preferably 1.0 or less, and particularly preferably 0.5 or less. Release agent Examples of the release agent include hydrocarbon-based waxes; natural waxes such as carnauba wax, rice wax, and candelilla wax; synthetic and mineral/petroleum-based waxes such as montan wax; and ester-based waxes such as fatty acid esters and montanic acid esters. The release agent is not limited to these waxes.

The melting temperature of the release agent is preferably 50° C. or higher and 110° C. or lower, and more preferably 60° C. or higher and 100° C. or lower.

The melting temperature is determined by using a differential scanning calorimetry (DSC) curve obtained by DSC from the "melting peak temperature" described in melting temperature determination methods in "Testing methods for transition temperatures of plastics" in JIS K 7121-1987.

The content of the release agent is preferably 1% by mass or more and 20% by mass or less, and more preferably 5% by mass or more and 15% by mass or less based on the total mass of the resin particles.

Other Additives

Examples of the other additives include publicly known additives such as a magnetic material, a charge control agent, and an inorganic powder. These additives are contained in the resin particles as internal additives. Characteristics etc. of resin particles The resin particles may each be a resin particle having a single-layer structure or a resin particle (core-shell particle) having a so-called core-shell structure that includes a core (core particle) and a covering layer (shell layer) covering the core. The resin particles having the core-shell structure each include, for example a core containing a binder resin, a fluorescent colorant, and optional components such as another colorant and a release agent; and a covering layer containing a binder resin.

The volume-average particle size ($D_{50v}$) of the resin particles is preferably 2 µm or more and 10 µm or less, and more preferably 4 µm or more and 8 µm or less.

The volume-average particle size of the resin particles is measured by using Coulter Multisizer II (manufactured by Beckman Coulter, Inc.) and using, as an electrolyte, ISO-TON-II (manufactured by Beckman Coulter, Inc.).

In the measurement, 0.5 mg or more and 50 mg or less of a measurement sample is added to 2 mL of a 5% by mass aqueous solution of a surfactant (preferably sodium alkylbenzene sulfonate) serving as a dispersant. The resulting mixture is added to 100 mL or more and 150 mL or less of the electrolyte.

The electrolyte in which the sample is suspended is subjected to a dispersion treatment for 1 minute by using an ultrasonic dispersion apparatus, and the sizes of particles within the range of 2 µm or more and 60 µm or less are then measured by using the Coulter Multisizer II with an aperture having an aperture diameter of 100 µm. The number of particles sampled is 50,000.

With regard to the particle sizes measured as described above, a cumulative distribution is determined on a volume basis from the small particle size side, and the particle size at a cumulative volume of 50% is defined as the volume-average particle size $D_{50v}$.

In the exemplary embodiment, the average circularity of the resin particles is not particularly limited. However, from the viewpoint of improving cleanability of the resin particles from an image carrier, the average circularity is preferably 0.91 or more and 0.98 or less, more preferably 0.94 or more and 0.98 or less, and still more preferably 0.95 or more and 0.97 or less.

In the exemplary embodiment, the circularity of a resin particle is represented by (the peripheral length of a circle having the same area as a projection image of the particle/the peripheral length of the projection image of the particle). The average circularity of the resin particles is the circularity at which a cumulative value determined from the small circularity side in the circularity distribution is 50%. The average circularity of the resin particles is determined by analyzing at least 3,000 resin particles with a flow-type particle image analyzer.

When the resin particles are produced by, for example, an aggregation-coalescence method, the average circularity of the resin particles can be controlled by adjusting the stirring rate of a dispersion, the temperature of the dispersion, or the holding time in a fusion/coalescence step.

External Additive

In the case where the resin particles are used as a toner for electrostatic image development described later, the resin particles may include an external additive, as needed.

The resin particles may be resin particles having no external additive or resin particles obtained by externally adding an external additive to resin particles.

Examples of the external additive include inorganic particles. Examples of the inorganic particles include particles of $SiO_2$, $TiO_2$, $Al_2O_3$, CuO, Zno, $SnO_2$, $CeO_2$, $Fe_2O_3$, MgO, Bao, Cao, $K_2O$, $Na_2O$, $ZrO_2$, Cao, $SiO_2$, $K_2O$, $(TiO_2)$ n, $Al_2O_3 \cdot 2SiO_2$, $CaCO_3$, $MgCO_3$, $BaSO_4$, and $MgSO_4$.

The surfaces of the inorganic particles serving as the external additive may be subjected to a hydrophobic treatment. The hydrophobic treatment is performed by, for example, immersing the inorganic particles in a hydrophobizing agent. Examples of the hydrophobizing agent include, but are not particularly limited to, silane coupling agents, silicone oils, titanate coupling agents, and aluminum coupling agents. These hydrophobizing agents may be used alone or in combination of two or more thereof.

The amount of the hydrophobizing agent may be, for example, 1 part by mass or more and 10 parts by mass or less relative to 100 parts by mass of the inorganic particles.

Examples of the external additive further include resin particles (particles of resins such as polystyrene, polymethyl methacrylate (PMMA), and melamine resins) and cleaning activating agents (such as metal salts of higher fatty acids typified by zinc stearate, and particles of fluorine-based polymers).

The amount of the external additive added externally is, for example, preferably 0.01% by mass or more and 10% by mass or less, and more preferably 0.01% by mass or more and 6% by mass or less based on the mass of the resin particles.

Applications of resin particles

The resin particles according to the exemplary embodiment are suitably used as resin particles for image formation, and more suitably used as a toner for electrostatic image development.

The resin particles according to the present exemplary embodiment are suitably used as a powder coating material. The resin particles can be used for producing a coated product by applying the resin particles to a surface to be coated, and subsequently performing heating (baking) to form a coating film in which a powder is cured. In this case, the coating and heating (baking) may be performed at a time.

The coating of the powder may be performed by using a well-known coating method such as spray coating, electrostatic powder coating, frictional electrification powder coating, or fluidized-bed coating. The coating film of the powder may have a thickness of, for example, 30 μm or more and 50 μm or less.

The heating temperature (baking temperature) is, for example, preferably 90° C. or higher and 250° C. or lower, more preferably 100° C. or higher and 220° C. or lower, and still more preferably 120° C. or higher and 200° C. or lower. The heating time (baking time) is adjusted according to the heating temperature (baking temperature).

Examples of the article to be coated with the powder include, but are not particularly limited to, various metal parts, ceramic parts, and resin parts. These articles to be coated may each be a product that has not been formed into an article such as a plate-like article or a linear article, or a product that has been formed into an article for, for example, an electronic part, a road vehicle, or a building interior or exterior material. The surface of the article to be coated may be preliminarily subjected to a surface treatment such as a primer treatment, a plating process, or electrodeposition coating.

Alternatively, in the fields other than coating, the resin particles according to the exemplary embodiment are suitably used as resin particles for toner display.

In the known toner display, charged resin particles are dispersed in a medium (in many cases, air), and the resin particles are moved by an electric field to thereby display an image. The resin particles according to the exemplary embodiment are employed in this system without a problem.

For example, the resin particles are placed in a cell sandwiched between two transparent electrodes, and the resin particles are moved by applying a voltage to display an image.

Method for Producing Resin Particles

Next, a method for producing the resin particles according to the present exemplary embodiment will be described.

The resin particles according to the exemplary embodiment may be obtained by producing resin particles and then externally adding an external additive to the resin particles.

The resin particles may be produced by a dry production method (such as a kneading-pulverization method) or by a wet production method (such as an aggregation-coalescence method, a suspension polymerization method, or a dissolution-suspension method). However, the production method is not particularly limited, and any publicly known production method may be employed. Among these methods, the aggregation-coalescence method may be employed to produce the resin particles.

Examples of the aggregation-coalescence method include the methods described in Japanese Unexamined Patent Application Publication Nos. 2010-97101 and 2006-154641.

An example of the kneading-pulverization method is the method described in Japanese Unexamined Patent Application Publication No. 2000-267338.

An example of the dissolution-suspension method is the method described in Japanese Unexamined Patent Application Publication No. 2000-258950.

When a fluorescent colorant having an anionic group and a binder resin having a cationic group are used in the method for producing the resin particles, a surfactant having a cationic group is preferably used from the viewpoint of fluorescence intensity and graininess of images. In the polymerization of a binder resin having a cationic group, a polymerization initiator having a cationic group is preferably used.

When a fluorescent colorant having a cationic group and a binder resin having an anionic group are used in the method for producing the resin particles, a surfactant having an anionic group is preferably used from the viewpoint of fluorescence intensity and graininess of images. In the polymerization of a binder resin having an anionic group, a polymerization initiator having an anionic group is preferably used.

The surfactant having a cationic group is preferably a cationic surfactant having an ammonium group, and more preferably a cationic surfactant having a quaternary ammonium group.

The polymerization initiator having a cationic group is preferably a polymerization initiator having an amino group or an amidine group, more preferably a polymerization initiator having an amidine group, and particularly preferably an azo polymerization initiator having an amidine group.

The surfactant having an anionic group is preferably an anionic surfactant having a sulfo group, a sulfate group, or a salt thereof, and more preferably an anionic surfactant having a sulfo group or a salt thereof.

The polymerization initiator having an anionic group is preferably a persulfate compound, and more preferably ammonium persulfate, potassium persulfate, or a sodium persulfate.

Specifically, when the resin particles are produced by, for example, the aggregation-coalescence method, the resin particles are produced through a step of preparing a resin particle dispersion in which resin particles used as a binder resin are dispersed (a resin particle dispersion preparation step); a step of aggregating the resin particles (and other particles as needed) in the resin particle dispersion (in a dispersion obtained after mixing with another particle dispersion as needed) to form aggregated particles (an aggregated particle formation step); and a step of heating an aggregated particle dispersion in which the aggregated particles are dispersed to fuse and coalesce the aggregated particles to form resin particles (a fusion/coalescence step).

Hereafter, these steps will be described in detail.

In the following, a method for obtaining resin particles including another colorant and a release agent will be described, but the other colorant and the release agent are optionally used. Of course, additives other than the other colorant and the release agent may be used.

Resin Particle Dispersion Preparation Step

A resin particle dispersion in which resin particles used as a binder resin are dispersed is prepared, and, for example, another colorant particle dispersion in which particles of another colorant are dispersed and a release agent particle dispersion in which release agent particles are dispersed are prepared.

The resin particle dispersion is prepared by, for example, dispersing resin particles in a dispersion medium with a surfactant.

Examples of the dispersion medium used for the resin particle dispersion include aqueous media.

Examples of the aqueous medium include water such as distilled water and ion-exchange water, and alcohols. These aqueous media may be used alone or in combination of two or more thereof.

Examples of the surfactant include anionic surfactants such as sulfate-based surfactants, sulfonate-based surfactants, phosphate-based surfactants, and soap-based surfactants; cationic surfactants such as amine salt surfactants and quaternary ammonium salt surfactants; and nonionic surfactants such as polyethylene glycol-based surfactants, alkylphenol ethylene oxide adduct-based surfactants, and polyhydric alcohol-based surfactants. Of these, an anionic surfactant or a cationic surfactant may be used. A nonionic surfactant may be used in combination with an anionic surfactant or a cationic surfactant.

In particular, a nonionic surfactant is preferably used. A nonionic surfactant and an anionic surfactant or a cationic surfactant are preferably used in combination.

As described above, when a fluorescent colorant having an anionic group and a binder resin having a cationic group are used in the method for producing the resin particles, a surfactant having a cationic group is preferably used from the viewpoint of fluorescence intensity and graininess of images. On the other hand, when a fluorescent colorant having a cationic group and a binder resin having an anionic group are used in the method for producing the resin particles, a surfactant having an anionic group is preferably used from the viewpoint of fluorescence intensity and graininess of images.

These surfactants may be used alone or in combination of two or more thereof.

Examples of the method for dispersing the resin particles in the dispersion medium to form the resin particle dispersion include typical dispersing methods that use, for example, a rotary shearing-type homogenizer, a ball mill with media, a sand mill, or a dyno-mill. For some types of resin particles, the resin particles may be dispersed in the dispersion medium by a phase inversion emulsification method. The phase inversion emulsification method is a method including dissolving a resin to be dispersed in a hydrophobic organic solvent that can dissolve the resin, neutralizing an organic continuous phase (0 phase) by adding a base thereto, and then performing phase inversion from W/O to o/W by pouring an aqueous medium (W phase) to thereby disperse the resin in the form of particles in the aqueous medium.

The volume-average particle size of the resin particles dispersed in the resin particle dispersion is, for example, preferably 0.01 µm or more and 1 µm or less, more preferably 0.08 µm or more and 0.8 µm or less, and still more preferably 0.1 µm or more and 0.6 µm or less.

The volume-average particle size of the resin particles is measured as follows. A particle size distribution measured by a laser diffraction particle size distribution measurement apparatus (for example, LA-700 manufactured by HORIBA, Ltd.) is divided into particle size ranges (channels). A cumulative volume distribution is determined from the small particle size side with respect to the particle size ranges (channels). The particle size at which the cumulative volume is 50% of all particles is measured as the volume-average particle size $D_{50v}$. The volume-average particle sizes of the particles in other dispersions are measured in the same manner.

The content of the resin particles contained in the resin particle dispersion is preferably 5% by mass or more and 50% by mass or less, and more preferably 10% by mass or more and 40% by mass or less.

Chemical Bond Formation Step

The method for producing the resin particles according to the present exemplary embodiment preferably includes a step of chemically bonding, to surfaces of resin particles having a group capable of forming a chemical bond, a fluorescent colorant having a group capable of reacting or interacting with the group capable of forming a chemical bond, and more preferably includes a step of ionically bonding a fluorescent colorant having an ionic group to surfaces of resin particles having an ionic group.

More specifically, for example, the method preferably includes a step of ionically bonding a fluorescent colorant having a cationic group to surfaces of resin particles having an anionic group, or a step of ionically bonding a fluorescent colorant having an anionic group to surfaces of resin particles having a cationic group.

In the description below, the resin particles are resin particles to which a fluorescent colorant is chemically bonded or resin particles to which a fluorescent colorant is molecularly dispersed, unless otherwise specified.

For example, another colorant particle dispersion and a release agent particle dispersion are also prepared as in the above resin particle dispersion. Specifically, the above descriptions of the volume-average particle size of—the particles, the dispersion medium, the dispersing method, and the content of the particles in the resin particle dispersion apply to those for colorant particles dispersed in the other colorant particle dispersion and release agent particles dispersed in the release agent particle dispersion.

Aggregated Particle Formation Step

Next, the resin particle dispersion, the other colorant particle dispersion, and the release agent particle dispersion are mixed.

Subsequently, the resin particles, the other colorant particles, and the release agent particles are hetero-aggregated in the dispersion mixture to form aggregated particles including the resin particles, the other colorant particles, and the release agent particles and having sizes close to the sizes of desired resin particles.

Specifically, for example, a flocculant is added to the dispersion mixture, and the pH of the dispersion mixture is adjusted to acidic (e.g., a pH of 2 or more and 5 or less). A dispersion stabilizer is optionally added, and the resulting mixture is then heated to a temperature close to the glass transition temperature of the resin particles (specifically, for example, a temperature of the glass transition temperature of the resin particles −30° C. or higher and the glass transition temperature −10° C. or lower) to aggregate the particles dispersed in the dispersion mixture. Thus, aggregated particles are formed.

In the aggregated particle formation step, for example, while the dispersion mixture is stirred in a rotary shearing-type homogenizer, the flocculant may be added at room temperature (e.g., 25° C.), and the pH of the dispersion mixture may be adjusted to acidic (e.g., a pH of 2 or more and 5 or less). The dispersion stabilizer may be optionally added, and the resulting mixture may then be heated.

Examples of the flocculant include surfactants having a polarity opposite to the polarity of the surfactant contained in the dispersion mixture, inorganic metal salts, and divalent or higher metal complexes. When a metal complex is used as the flocculant, the amount of the surfactant used can be reduced, and charging characteristics are improved.

An additive that forms a complex with a metal ion in the flocculant or a similar bond may be optionally used together with the flocculant. A chelating agent may be used as the additive.

Examples of the inorganic metal salts include metal salts such as calcium chloride, calcium nitrate, barium chloride, magnesium chloride, zinc chloride, aluminum chloride, and aluminum sulfate; and inorganic metal salt polymers such as polyaluminum chloride, polyaluminum hydroxide, and calcium polysulfide.

The chelating agent used may be a water-soluble chelating agent. Examples of the chelating agent include oxycarboxylic acids such as tartaric acid, citric acid, and gluconic acid; and aminocarboxylic acids such as iminodiacetic acid (IDA), nitrilotriacetic acid (NTA), and ethylenediaminetetraacetic acid (EDTA).

The amount of the flocculant added is preferably 0.01 parts by mass or more and 5.0 parts by mass or less, and more preferably 0.1 parts by mass or more and less than 3.0 parts by mass relative to 100 parts by mass of the resin particles.

Fusion/Coalescence Step

Next, the resulting aggregated particle dispersion in which the aggregated particles are dispersed is heated to, for example, a temperature that is equal to or higher than the glass transition temperature of the resin particles (e.g., equal to or higher than a temperature 30° C. to 50° C. higher than the glass transition temperature of the resin particles) and that is equal to or higher than the melting temperature of the release agent to fuse and coalesce the aggregated particles. Thus, resin particles are formed.

In the fusion/coalescence step, the resin and the release agent are fused together at the temperature that is equal to or higher than the glass transition temperature of the resin particles and that is equal to or higher than the melting temperature of the release agent. Subsequently, cooling is performed to obtain resin particles.

The aspect ratio of the release agent in the resin particles can be adjusted by the following methods. During cooling, the dispersion is held at a temperature around the solidification point of the release agent for a certain period of time to cause crystal growth. Alternatively, two or more release agents having different melting temperatures are used to thereby promote crystal growth during cooling.

The resin particles are obtained through the steps described above.

Alternatively, the resin particles may be produced through a step of, after the preparation of the aggregated particle dispersion in which the aggregated particles are dispersed, further mixing the aggregated particle dispersion with a resin particle dispersion in which resin particles are dispersed, and causing aggregation such that the resin particles further adhere to the surfaces of the aggregated particles to thereby form second aggregated particles; and a step of heating a second aggregated particle dispersion in which the second aggregated particles are dispersed to fuse and coalesce the second aggregated particles to thereby form resin particles having a core-shell structure.

After completion of the fusion/coalescence step, the resin particles formed in the solution are subjected to a publicly known washing step, solid-liquid separation step, and drying step to obtain dried resin particles. From the viewpoint of chargeability, the washing step may be performed by sufficient displacement washing with ion-exchange water. From the viewpoint of productivity, the solid-liquid separation step may be performed by, for example, suction filtration or pressure filtration. From the viewpoint of productivity, the drying step may be performed by, for example, freeze-drying, flash drying, fluidized drying, or vibrating fluidized drying.

When the resin particles according to the exemplary embodiment are used as a toner for electrostatic image development, the toner is produced by, for example, adding an external additive to the dried resin particle obtained as described above and mixing the resulting mixture. The mixing may be performed by using, for example, a V-blender, a Henschel mixer, or a Loedige mixer.

Furthermore, if necessary, coarse particles in the resin particles may be removed by using, for example, a vibrating sieve machine or an air sieve machine.

Electrostatic Image Developer

When the resin particles according to the exemplary embodiment are used as an electrostatic image developer, the electrostatic image developer may be a one-component developer including only the resin particles according to the exemplary embodiment or may be a two-component developer including a mixture of the resin particles and a carrier.

The carrier is not particularly limited, and a publicly known carrier may be used. Examples of the carrier include a coated carrier prepared by coating the surface of a core formed of a magnetic powder with a resin, a magnetic powder-dispersed carrier prepared by blending a magnetic powder so as to be dispersed in a matrix resin, and a resin-impregnated carrier prepared by impregnating a porous magnetic powder with a resin. The magnetic powder-dispersed carrier and the resin-impregnated carrier may each be a carrier in which the particles constituting such a carrier serve as cores and the surfaces of the cores are coated with a resin.

Examples of the material of the magnetic powder include magnetic metals such as iron, nickel, and cobalt; and magnetic oxides such as ferrite and magnetite.

Examples of the coating resin and the matrix resin include polyethylene, polypropylene, polystyrene, polyvinyl acetate, polyvinyl alcohol, polyvinyl butyral, polyvinyl chloride, polyvinyl ether, polyvinyl ketone, vinyl chloride-vinyl acetate copolymers, styrene-acrylate copolymers, straight silicone resins having organosiloxane bonds and modified resins thereof, fluororesins, polyesters, polycarbonates, phenolic resins, and epoxy resins. The coating resin and the matrix resin may contain additives such as electrically conductive particles. Examples of the electrically conductive particles include particles of metals such as gold, silver, and copper; and particles of carbon black, titanium oxide, zinc oxide, tin oxide, barium sulfate, aluminum borate, and potassium titanate.

From the viewpoint of suppressing density unevenness in an image to be obtained, in particular, a carrier having a surface coated with a resin including a silicone resin is preferred, and a carrier having a surface coated with a silicone resin is more preferred.

An example of the method for coating the surface of the core material with a resin includes coating the surface of the core material with a coating layer-forming solution prepared by dissolving the coating resin and additives (optionally used) in an appropriate solvent. The solvent is not particularly limited and may be selected in consideration of, for example, the type of the resin used and coatability. Specific examples of the resin coating method include an immersion method in which the core material is immersed in the coating layer-forming solution, a spray method in which the coating layer-forming solution is sprayed onto the surface of the core material, a fluidized bed method in which the coating layer-forming solution is sprayed onto the core material while the core material is floated by fluidizing air, and a kneader-coater method in which the core material and the coating layer-forming solution are mixed in a kneader coater and a solvent is then removed.

The mixing ratio (mass ratio) of the resin particles (toner for electrostatic image development) and the carrier in the two-component developer is preferably resin particles (toner for electrostatic image development): carrier=1:100 to 30:100 and more preferably 3:100 to 20:100.

Image Forming Apparatus and Image Forming Method

A description will be made of an image forming apparatus and an image forming method where the resin particles according to the exemplary embodiment are used as a toner for electrostatic image development.

The image forming apparatus includes an image carrier, a charging unit that charges a surface of the image carrier, an electrostatic image forming unit that forms an electrostatic image on the charged surface of the image carrier, a developing unit that contains an electrostatic image developer and that develops the electrostatic image formed on the surface of the image carrier by using the electrostatic image developer to form a toner image, a transfer unit that transfers the toner image formed of the surface of the image carrier onto a surface of a recording medium, and a fixing unit that fixes the toner image transferred onto the surface of the recording medium. The electrostatic image developer is an electrostatic image developer including the resin particles according to the exemplary embodiment.

In the image forming apparatus, an image forming method is performed. The image forming method includes a charging step of charging a surface of an image carrier, an electrostatic image-forming step of forming an electrostatic image on the charged surface of the image carrier, a development step of developing the electrostatic image formed on the surface of the image carrier by using an electrostatic image developer including the resin particles according to the exemplary embodiment to form a toner image, a transfer step of transferring the toner image formed on the surface of the image carrier onto a surface of a recording medium, and a fixing step of fixing the toner image transferred onto the surface of the recording medium.

The image forming apparatus may be applied to publicly known image forming apparatuses such as a direct transfer-type apparatus that transfers a toner image formed on a surface of an image carrier directly onto a recording medium, an intermediate transfer-type apparatus that first-transfers a toner image formed on a surface of an image carrier onto a surface of an intermediate transfer body and second-transfers the toner image transferred onto the surface of the intermediate transfer body onto a surface of a recording medium, an apparatus including a cleaning unit that cleans a surface of an image carrier after transfer of a toner image but before charging, and an apparatus including a charge erasing unit that erases charges on a surface of an image carrier after transfer of a toner image but before charging by irradiating the surface of the image carrier with charge erasing light.

When the image forming apparatus is the intermediate transfer-type apparatus, the transfer unit includes, for example, an intermediate transfer body having a surface onto which a toner image is to be transferred, a first transfer unit that first-transfers a toner image formed on a surface of an image carrier onto the surface of the intermediate transfer body, and a second transfer unit that second-transfers the toner image transferred onto the surface of the intermediate transfer body onto a surface of a recording medium.

In the image forming apparatus, for example, a portion including the developing unit may have a cartridge structure (process cartridge) that is attachable to and detachable from the image forming apparatus. The process cartridge used may be, for example, a process cartridge that includes a developing unit containing an electrostatic image developer including the resin particles according to the exemplary embodiment.

A non-limiting example of the image forming apparatus will now be described. In the description below, major components illustrated in the figure will be described, and a description of other components will be omitted.

Figure 2:
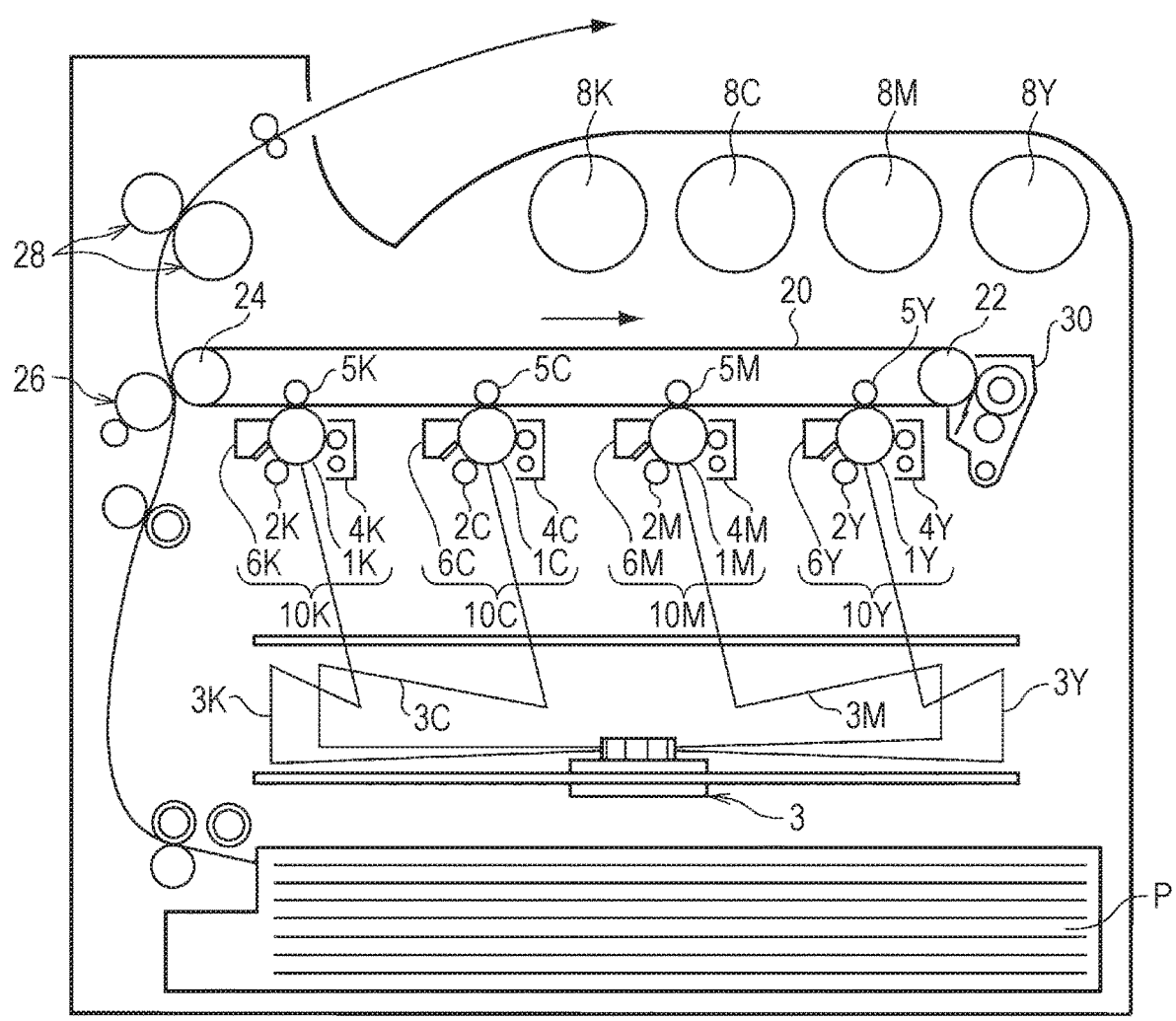
FIG. 2 is a schematic diagram of an image forming apparatus used in an exemplary embodiment.

FIG. 2 is a schematic diagram of an image forming apparatus used in the exemplary embodiment.

The image forming apparatus illustrated in FIG. 2 includes first to fourth electrophotographic image forming units 10Y, 10M, 10C, and 10K (image forming units) that output yellow (Y), magenta (M), cyan (C), and black (K) images, respectively, on the basis of color-separated image data. These image forming units (hereinafter simply referred to as "units") 10Y, 10M, 10C, and 10K are arranged in a horizontal direction so as to be spaced apart from each other by a predetermined distance. These units 10Y, 10M, 10C, and 10K may be process cartridges that are attachable to and detachable from the image forming apparatus.

An intermediate transfer belt (an example of the intermediate transfer body) 20 is disposed above the units 10Y, 10M, 10C, and 10K so as to extend through the units. The intermediate transfer belt 20 is wound around a driving roller 22 and a support roller 24 that are in contact with the inner surface of the intermediate transfer belt 20 and is configured to run in a direction from the first unit 10Y toward the fourth unit 10K. A force is applied to the support roller 24 by a spring or the like (not shown) in a direction away from the driving roller 22, so that a tension is applied to the intermediate transfer belt 20 wound around the two rollers. An intermediate transfer belt cleaning device 30 is disposed on an image carrying surface of the intermediate transfer belt 20 so as to face the driving roller 22.

Yellow, magenta, cyan, and black toners contained in toner cartridges 8Y, 8M, 8C, and 8K, respectively, are supplied to developing devices (examples of the developing units) 4Y, 4M, 4C, and 4K of the units 10Y, 10M, 10C, and 10K, respectively.

The first to fourth units 10Y, 10M, 10C, and 10K have substantially the same configuration and operate similarly. Therefore, the first unit 10Y that is disposed upstream in the direction in which the intermediate transfer belt runs and that forms a yellow image will be described as a representative example.

The first unit 10Y includes a photoreceptor 1Y serving as an image carrier. A charging roller (an example of the charging unit) 2Y, an exposure device (an example of the electrostatic image forming unit) 3, a developing device (an example of the developing unit) 4Y, a first transfer roller (an example of the first transfer unit) 5Y, and a photoreceptor cleaning device (an example of an image carrier cleaning unit) 6Y are disposed around the photoreceptor 1Y in this order. The charging roller 2Y charges the surface of the photoreceptor 1Y to a predetermined potential. The exposure device 3 exposes the charged surface to a laser beam 3Y emitted in accordance with a color-separated image signal to thereby form an electrostatic image. The developing device 4Y supplies a charged toner to the electrostatic image to develop the electrostatic image. The first transfer roller 5Y transfers the developed toner image onto the intermediate transfer belt 20. The photoreceptor cleaning device 6Y removes the toner remaining on the surface of the photoreceptor 1Y after the first transfer.

The first transfer roller 5Y is disposed on the inner side of the intermediate transfer belt 20 and located at a position facing the photoreceptor 1Y. Bias power supplies (not shown) that apply a first transfer bias are connected to the respective first transfer rollers 5Y, 5M, 5C, and 5K of the units. The bias power supplies are controlled by a controller (not shown) to change the value of the transfer bias applied to the first transfer rollers.

An operation for forming a yellow image in the first unit 10Y will now be described.

First, prior to the operation, the surface of the photoreceptor 1Y is charged by the charging roller 2Y to a potential of −600 V to −800 V.

The photoreceptor 1Y is produced by forming a photosensitive layer on a conductive substrate (having a volume resistivity of, for example, $1 \times 10^{-6}$ Ωcm or less at 20° C.). The photosensitive layer usually has a high resistance (the resistance of a typical resin) but has the property that, when irradiated with a laser beam, the specific resistance of a portion that has been irradiated with the laser beam is changed. Accordingly, the charged surface of the photoreceptor 1Y is irradiated with a laser beam 3Y emitted from the exposure device 3 in accordance with yellow image data sent from a controller (not shown). Consequently, an electrostatic image with a yellow image pattern is formed on the surface of the photoreceptor 1Y.

The electrostatic image is an image formed on the surface of the photoreceptor 1Y by charging and is a so-called negative latent image formed in the following manner. The specific resistance of regions of the photosensitive layer, the regions being irradiated with the laser beam 3Y, decreases, so that charges on the surface of the photoreceptor 1Y flow out, whereas the charges in regions that are not irradiated with the laser beam 3Y remain.

The electrostatic image formed on the photoreceptor 1Y rotates to a predetermined developing position as the photoreceptor 1Y runs. The electrostatic image on the photoreceptor 1Y at this developing position is then developed and visualized as a toner image by the developing device 4Y.

The developing device 4Y contains an electrostatic image developer including, for example, at least a yellow toner and a carrier. The yellow toner is stirred in the developing device 4Y and thereby frictionally charged. The charged yellow toner has a charge having the same polarity (negative polarity) as the charge on the photoreceptor 1Y and is held on a developer roller (an example of a developer holding member). As the surface of the photoreceptor 1Y passes through the developing device 4Y, the yellow toner electrostatically adheres to charge-erased latent image portions on the surface of the photoreceptor 1Y, and the latent image is thereby developed with the yellow toner. The photoreceptor 1Y having the yellow toner image thereon continues to run at a predetermined speed, and the toner image developed on the photoreceptor 1Y is transported to a predetermined first transfer position.

When the yellow toner image on the photoreceptor 1Y is transported to the first transfer position, a first transfer bias is applied to the first transfer roller 5Y, and an electrostatic force directed from the photoreceptor 1Y toward the first transfer roller 5Y acts on the toner image. Thus, the toner image on the photoreceptor 1Y is transferred onto the intermediate transfer belt 20. The transfer bias applied at this time has a (+) polarity opposite to the (−) polarity of the toner and is controlled by the controller (not shown) to, for example, +10 μA in the first unit 10Y. The toner remaining on the photoreceptor 1Y is removed and collected by the photoreceptor cleaning device 6Y.

The first transfer biases applied to the first transfer rollers 5M, 5C, and 5K of the second unit 10M and subsequent units are also controlled according to the first unit.

The intermediate transfer belt 20 on which the yellow toner image has been transferred in the first unit 10Y is sequentially transported through the second to fourth units 10M, 10C and 10K, and toner images of respective colors are transferred on top of each other.

The intermediate transfer belt 20 to which the four color toner images have been transferred on top of each other through the first to fourth units reaches a second transfer portion that is composed of the intermediate transfer belt 20, the support roller 24 in contact with the inner surface of the intermediate transfer belt, and a second transfer roller (an example of the second transfer unit) 26 disposed on the image carrying surface of the intermediate transfer belt 20. A recording sheet (an example of the recording medium) P is supplied to a gap between the second transfer roller 26 and the intermediate transfer belt 20 that are in contact with each other at a predetermined timing through a supply mechanism, and a second transfer bias is applied to the support roller 24. The transfer bias applied at this time has the same polarity (−) as the polarity (−) of the toner, and an electrostatic force directed from the intermediate transfer belt 20 toward the recording sheet P acts on the toner images. Thus, the toner images on the intermediate transfer belt 20 are transferred onto the recording sheet P. The second transfer bias applied at this time is determined according to a resistance detected by resistance detector (not shown) that detects the resistance of the second transfer portion and is controlled in terms of voltage.

The recording sheet P to which the toner images are transferred is sent to a pressure contact portion (nip) of a pair of fixing rollers in a fixing device (an example of the fixing unit) 28, and the toner images are fixed onto the recording sheet P to thereby form a fixed image. The recording sheet P to which the color image has been fixed is transported to an ejection portion, and a series of the color image formation operations is completed.

Examples of the recording sheet P onto which toner images are transferred include plain paper used for, for example, electrophotographic copying machines and printers. Examples of the recording medium include OHP sheets besides the recording sheet P. In order to further improve the smoothness of the surfaces of images after fixing, the recording sheet P also preferably has a smooth surface. For example, coat paper produced by coating the surface of plain paper with a resin or the like, and art paper for printing are suitably used.

Process Cartridge and Toner Cartridge

A process cartridge in which the resin particles according to the exemplary embodiment are used as an electrostatic image developer includes a developing unit that contains the electrostatic image developer including the resin particles according to the exemplary embodiment and that develops an electrostatic image formed on the surface of an image carrier with the electrostatic image developer to form a toner image, the process cartridge being attachable to and detachable from an image forming apparatus.

The process cartridge may include the developing unit and optionally at least one selected from other units such as an image carrier, a charging unit, an electrostatic image forming unit, and a transfer unit.

Hereafter, a non-limiting example of the process cartridge will be described. In the following description, major components illustrated in the figure will be described, and a description of other components will be omitted.

Figure 3:
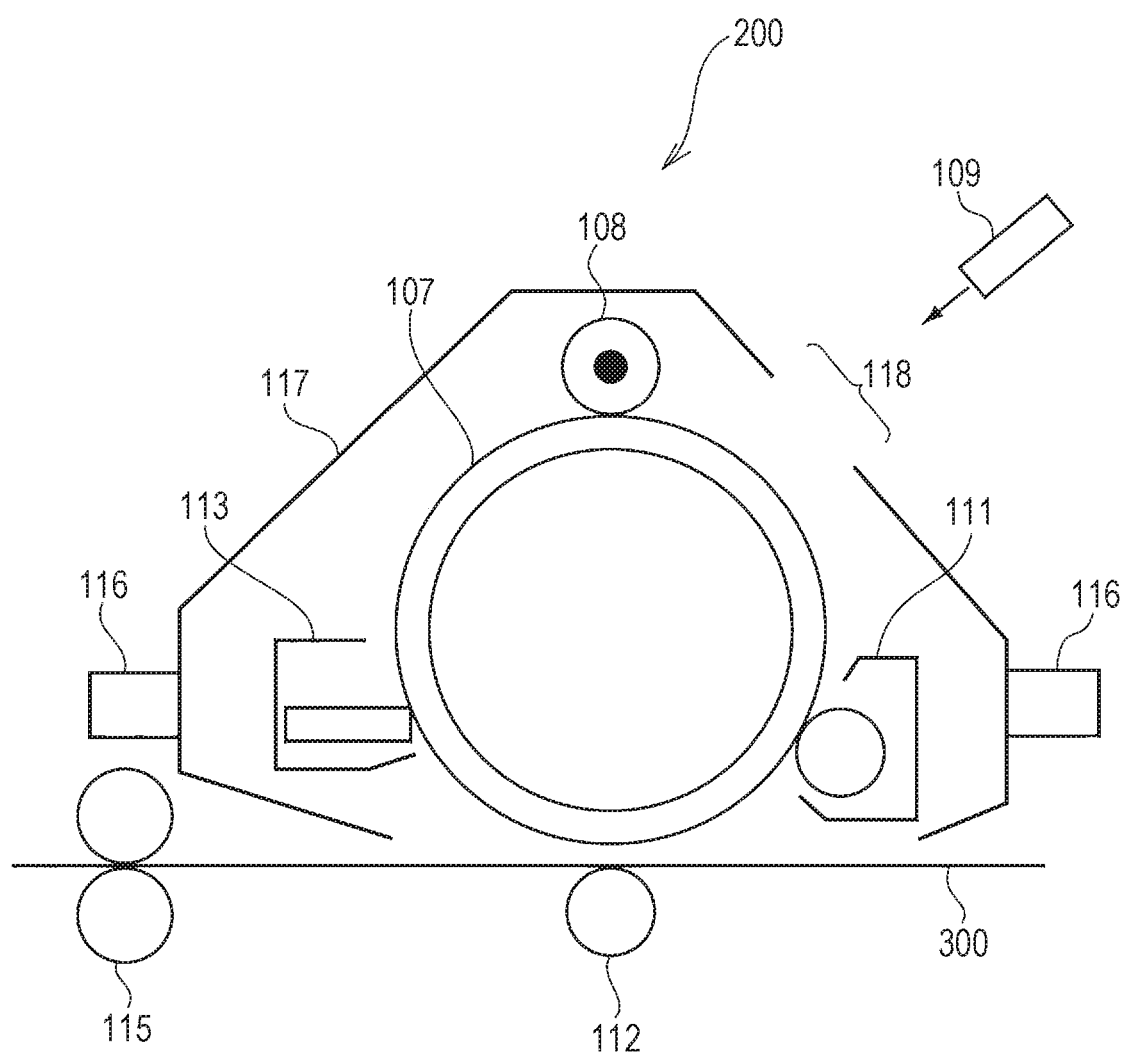
FIG. 3 is a schematic diagram of a process cartridge used in an exemplary embodiment.

FIG. 3 is a schematic diagram illustrating an example of the process cartridge used in the exemplary embodiment.

A process cartridge 200 illustrated in FIG. 3 includes, for example, a housing 117 having mounting rails 116 and an opening 118 for light exposure and further includes a photoreceptor 107 (an example of the image carrier) and a charging roller 108 (an example of the charging unit), a developing device 111 (an example of the developing unit), and a photoreceptor cleaning device 113 (an example of the cleaning unit) that are disposed around the photoreceptor 107. The housing 117 integrates and holds the photoreceptor 107, the charging roller 108, the developing device 111, and the photoreceptor cleaning device 113 to thereby form a cartridge.

FIG. 3 further illustrates an exposure device 109 (an example of the electrostatic image forming unit), and a transfer device 112 (an example of the transfer unit), a fixing device 115 (an example of the fixing unit), and a recording sheet 300 (an example of the recording medium).

Next, a toner cartridge will be described.

The toner cartridge contains the resin particles according to the exemplary embodiment as a toner for electrostatic image development and is attachable to and detachable from an image forming apparatus. The toner cartridge contains a replenishment toner to be supplied to the developing unit disposed in the image forming apparatus.

The image forming apparatus illustrated in FIG. 2 is configured so that the toner cartridges 8Y, 8M, 8C, and 8K are attachable to and detachable from the image forming apparatus. The developing devices 4Y, 4M, 4C, and 4K are connected to the toner cartridges of corresponding colors with toner supply tubes (not shown) therebetween. When the amount of the remaining toner contained in a toner cartridge becomes small, this toner cartridge is replaced.

EXAMPLES

Examples of the present disclosure will now be described. However, the present disclosure is not limited to these Examples. In the following description, "parts" and "%" are all based on mass, unless otherwise specified.

Example 1

Preparation of binder resin particle dispersion (1): Example of preparation of cationic particles by emulsion polymerization Styrene (manufactured by FUJIFILM Wako Pure Chemical Corporation): 80.0 parts
Dimethylaminoethyl acrylate (manufactured by Tokyo Chemical Industry Co., Ltd.): 20.0 parts
Cationic surfactant (manufactured by Kao Corporation, QUARTAMIN 86W): 3.6 parts
Cationic polymerization initiator (manufactured by FUJIFILM Wako Pure Chemical Corporation, VA-50): 1.0 part
Deionized water (DIW): 397 parts The above materials are mixed in a flask and emulsified for 10 minutes by using a homogenizer (ULTRA-TURRAX T50, manufactured by IKA). Next, the inside of the flask is purged with nitrogen, the flask is then heated in a water bath until the temperature reaches 85° C. while the solution in the flask is stirred, and, in this state, emulsion polymerization is performed for 5 hours. Subsequently, cooling is performed until the temperature decreases to 30° C. to obtain a cationic resin particle dispersion (1) having a solid content of 20% by mass. A binder resin particle dispersion (1) including binder resin particles having an average particle size of 130 nm is obtained.

Preparation of resin particle dispersion (1) including resin particles to which fluorescent colorant is ionically bonded Binder resin particle dispersion (1): 475 parts
Anionic fluorescent colorant (Acid Red 52, manufactured by Tokyo Chemical Industry Co., Ltd.): 5 parts The above materials are mixed, and the pH of the resulting mixture is adjusted to 4.5. Subsequently, the mixture is stirred at 60° C. for 1 hour. The solid content is adjusted to 20% by mass to obtain a fluorescent colorant particle dispersion (1).

Preparation of release agent particle dispersion (1)

Paraffin wax (manufactured by NIPPON SEIRO CO., LTD., HNP-9): 100 parts
Anionic surfactant (manufactured by DKS Co. Ltd., Neogen RK): 1 part
Ion-exchange water: 350 parts The above materials are mixed, heated to 100° C., and dispersed by using a homogenizer (trade name: ULTRA-TURRAX T50, manufactured by IKA). The resulting liquid is then subjected to a dispersion treatment using a Manton-Gaulin high-pressure homogenizer (manufactured by Gaulin Corporation) to obtain a release agent particle dispersion (1) (solid content: 20% by mass) in which release agent particles having a volume-average particle size of 200 nm are dispersed.

Preparation of toner particles (1)

Fluorescent colorant particle dispersion (1): 450 parts
Release agent particle dispersion (1): 50 parts
Anionic surfactant (manufactured by DKS Co. Ltd., Neogen RK, 20%): 10 parts The above materials are placed in a round-bottom flask made of stainless steel, and 0.1N(=mol/L) nitric acid is added thereto to adjust the pH to 3.5. Subsequently, 30 parts of an aqueous nitric acid solution having a polyaluminum chloride concentration of 10% by mass is added. Next, the resulting mixture is dispersed at a liquid temperature of 30° C. by using a homogenizer (trade name: ULTRA-TURRAX T50, manufactured by IKA), and the resulting dispersion is then heated to 45° C. in a heating oil bath and held for 30 minutes. Subsequently, a 0.1 mol/L aqueous sodium hydroxide solution is added to adjust the pH to 8.5, and the dispersion is then heated to 84° C. and held for 2.5 hours. Next, the dispersion is cooled to 20° C. at a rate of 20° C./minute, and the solid matter is separated by filtration, sufficiently washed with ion-exchange water, and dried to obtain toner particles (1). The toner particles (1) have a volume-average particle size of 5.9 μm.

Preparation of carrier 1

Ferrite particles (average particle size: 35 μm): 100 parts
Toluene: 14 parts
Polymethyl methacrylate (PMMA, weight-average molecular weight: 75,000): 5 parts
Carbon black: 0.2 parts (VXC-72, manufactured by Cabot Corporation, volume resistivity: 100 Ωcm or less)

The above materials except for the ferrite particles are dispersed in a sand mill to prepare a dispersion. This dispersion is placed in a vacuum degassing kneader together with the ferrite particles, and the resulting mixture is dried under reduced pressure while stirring to obtain a carrier 1.

Preparation of Toner

Relative to 100 parts by mass of the toner particles (1) obtained as described above, 1.5 parts by mass of hydrophobic silica (RY50, manufactured by Nippon Aerosil Co., Ltd.) and 1.0 part by mass of hydrophobic titanium oxide (T805, manufactured by Nippon Aerosil Co., Ltd.) are added, and the resulting mixture is blended at 10,000 rpm (revolutions per minute) for 30 seconds by using a sample mill. The mixture is then sieved by using a vibrating sieve with a mesh size of 45 μm to prepare a toner 1 (toner for electrostatic image development). The toner 1 has a volume-average particle size of 6.0 μm.

Preparation of Electrostatic Image Developer

Eight parts of the toner 1 and 92 parts of the carrier 1 are mixed by using a V-blender to prepare a developer 1 (electrostatic image developer).

Example 2

Preparation of toner particles (2)
Fluorescent colorant particle dispersion (1): 450 parts
Release agent particle dispersion (1): 50 parts
Anionic surfactant (manufactured by DKS Co. Ltd.: Neogen RK, 20%): 10 parts The above materials are placed in a round-bottom flask made of stainless steel, and 0.1 N(=mol/L) nitric acid is added thereto to adjust the pH to 3.5. Subsequently, 30 parts of an aqueous nitric acid solution having a polyaluminum chloride concentration of 10% by mass is added. Next, the resulting mixture is dispersed at a liquid temperature of 30° C. by using a homogenizer (trade name: ULTRA-TURRAX T50, manufactured by IKA), and the resulting dispersion is then heated to 45° C. in a heating oil bath and held for 30 minutes. Subsequently, 50 parts of the binder resin particle dispersion (1) is added, the resulting dispersion is held for 1 hour, and a 0.1 mol/L aqueous sodium hydroxide solution is added to adjust the pH to 8.5. The dispersion is then heated to 84° C. and held for 2.5 hours. Next, the dispersion is cooled to 20° C. at a rate of 20° C./minute, and the solid matter is separated by filtration, sufficiently washed with ion-exchange water, and dried to obtain toner particles (2). The toner particles (2) have a volume-average particle size of 6.0 μm.

Example 3

Preparation of binder resin particle dispersion (2): Example of preparation of anionic particles by emulsion polymerization Styrene (manufactured by FUJIFILM Wako Pure Chemical Corporation): 65.0 parts
n-Butyl acrylate (manufactured by FUJIFILM Wako Pure Chemical Corporation): 30.0 parts
Sodium p-styrenesulfonate (manufactured by Tosoh Corporation, SPINOMAR NaSS): 5.0 parts
Anionic surfactant (manufactured by DKS Co. Ltd., Neogen RK): 1.0 part
Anionic polymerization initiator (ammonium persulfate): 1.0 part
DIW: 400 parts The above materials are mixed in a flask and emulsified for 10 minutes by using a homogenizer (ULTRA-TURRAX T50, manufactured by IKA). Next, the inside of the flask is purged with nitrogen, the flask is then heated in a water bath until the temperature reaches 85° C. while the solution in the flask is stirred, and, in this state, emulsion polymerization is performed for 5 hours. Subsequently, cooling is performed until the temperature decreases to 30° C. to obtain an anionic resin particle dispersion (2) having a solid content of 20% by mass. A binder resin particle dispersion (2) including binder resin particles having an average particle size of 180 nm is obtained.

Preparation of resin particle dispersion (2) including resin particles to which fluorescent colorant is ionically bonded
Binder resin particle dispersion (2): 475 parts
Cationic fluorescent colorant (manufactured by Taoka Chemical Co., Ltd., Rhodamine A (Basic Violet 11:1)): 5 parts The above materials are mixed, and the pH of the resulting mixture is adjusted to 4.5. Subsequently, the mixture is stirred at 60° C. for 1 hour. The solid content is adjusted to 20% to obtain a fluorescent colorant particle dispersion (2).

A toner for electrostatic image development and an electrostatic image developer are prepared as in Example 1 except that the fluorescent colorant particle dispersion (2) is used instead of the fluorescent colorant particle dispersion (1), and the binder resin particle dispersion (2) is used instead of the binder resin particle dispersion (1).

Example 4

A toner for electrostatic image development and an electrostatic image developer are prepared as in Example 2 except that the fluorescent colorant particle dispersion (2) is used instead of the fluorescent colorant particle dispersion (1), and the binder resin particle dispersion (2) is used instead of the binder resin particle dispersion (1). Examples 5 and 6

A toner for electrostatic image development and an electrostatic image developer are prepared as in Example 4 except that the amount of the fluorescent colorant particle dispersion (2) is adjusted according to the compositions shown in Table 1.

Example 7

Preparation of binder resin particle dispersion (3)
Terephthalic acid: 30 parts by mole
Fumaric acid: 70 parts by mole
Ethylene oxide adduct of bisphenol A: 5 parts by mole
Propylene oxide adduct of bisphenol A: 95 parts by mole The above materials are placed in a flask equipped with a stirrer, a nitrogen inlet tube, a temperature sensor, and a distillation column, the temperature is increased to 220° C. over a period of 1 hour, and 1 part of titanium tetraethoxide is added relative to 100 parts of the materials. The temperature is increased to 230° C. over a period of 30 minutes while water generated is distilled off. A dehydration-condensation reaction is continued at this temperature for 1 hour, and the reaction product is then cooled. Thus, a polyester resin having a weight-average molecular weight of 18,000 and a glass transition temperature of 60° C. is obtained.

In a container equipped with a temperature-control unit and a nitrogen-purge unit, 40 parts of ethyl acetate and 25 parts of 2-butanol are placed to prepare a mixed solvent. Subsequently, 100 parts of the polyester resin is gradually added to the mixed solvent and dissolved. A 10% by mass aqueous ammonia solution is added thereto (in an amount corresponding to three times the acid value of the resin in terms of molar ratio), and stirring is performed for 30 minutes. Subsequently, the inside of the container is purged with dry nitrogen. The temperature is maintained at 40° C., and 400 parts of ion-exchange water is added dropwise at a rate of 2 parts/minute while the liquid mixture is stirred.

After completion of the dropwise addition, the temperature is returned to room temperature (20° C. to 25° C.), and dry nitrogen is bubbled for 48 hours while stirring to thereby obtain a resin particle dispersion in which the amounts of ethyl acetate and 2-butanol are reduced to 1,000 ppm or less. Ion-exchange water is added to the resin particle dispersion so that the solid content is adjusted to 20% by mass. Thus, a binder resin particle dispersion (3) is obtained.

A fluorescent colorant particle dispersion (3) is prepared as in the preparation of the fluorescent colorant particle dispersion (2) except that the binder resin particle dispersion (3) is used instead of the binder resin particle dispersion (2).

Preparation of toner particles (7)
Fluorescent colorant particle dispersion (3): 450 parts
Release agent particle dispersion (1): 50 parts
Anionic surfactant (manufactured by DKS Co. Ltd.: Neogen RK, 20%): 10 parts The above materials are placed in a round-bottom flask made of stainless steel, and 0.1 N(=mol/L) nitric acid is added thereto to adjust the pH to 3.5. Subsequently, 30 parts of an aqueous nitric acid solution having a polyaluminum chloride concentration of 10% by mass is added. Next, the resulting mixture is dispersed at a liquid temperature of 30° C. by using a homogenizer (trade name: ULTRA-TURRAX T50, manufactured by IKA), and the resulting dispersion is then heated to 45° C. in a heating oil bath and held for 30 minutes. Subsequently, a 0.1 mol/L aqueous sodium hydroxide solution is added to adjust the pH to 8.5, and the dispersion is then heated to 84° C. and held for 2.5 hours. Next, the dispersion is cooled to 20° C. at a rate of 20° C./minute, and the solid matter is separated by filtration, sufficiently washed with ion-exchange water, and dried to obtain toner particles (7). The toner particles (7) have a volume-average particle size of 5.8 μm.

A toner for electrostatic image development and an electrostatic image developer are prepared as in Example 1 except that the toner particles (7) are used instead of the toner particles (1).

Example 8

Fluorescent colorant particle dispersion (3): 450 parts
Release agent particle dispersion (1): 50 parts
Anionic surfactant (manufactured by DKS Co. Ltd.: Neogen RK, 20%): 10 parts The above materials are placed in a round-bottom flask made of stainless steel, and 0.1 N(=mol/L) nitric acid is added thereto to adjust the pH to 3.5. Subsequently, 30 parts of an aqueous nitric acid solution having a polyaluminum chloride concentration of 10% by mass is added. Next, the resulting mixture is dispersed at a liquid temperature of 30° C. by using a homogenizer (trade name: ULTRA-TURRAX T50, manufactured by IKA), and the resulting dispersion is then heated to 45° C. in a heating oil bath and held for 30 minutes. Subsequently, 50 parts of the binder resin particle dispersion (3) is added, the resulting dispersion is held for 1 hour, and a 0.1 mol/L aqueous sodium hydroxide solution is added to adjust the pH to 8.5. The dispersion is then heated to 84° C. and held for 2.5 hours. Next, the dispersion is cooled to 20° C. at a rate of 20° C./minute, and the solid matter is separated by filtration, sufficiently washed with ion-exchange water, and dried to obtain toner particles (8). The toner particles (8) have a volume-average particle size of 5.9 μm.

A toner for electrostatic image development and an electrostatic image developer are prepared as in Example 1 except that the toner particles (8) are used instead of the toner particles (1).

Examples 9 to 12

Preparation of Resin Particle Dispersions (4) to (7) Including Resin Particles to which Fluorescent Colorant is Ionically Bonded Fluorescent colorant particle dispersions (4) to (7) are respectively prepared as in the fluorescent colorant particle dispersion (2) except that the cationic fluorescent colorant of the resin particle dispersion (2) including resin particles to which a fluorescent colorant is ionically bonded is changed to Basic Yellow 40 (Neeliglow Yellow 40, manufactured by Neelikon Food Dyes And Chemicals Ltd.), Basic Green 1 (Basic Green 1, manufactured by Tokyo Chemical Industry Co., Ltd.), Basic Red 1:1 (Rhodamine 6GCP-N, manufactured by Taoka Chemical Co., Ltd.), or Basic Orange 15 (Phosphine 2RN, manufactured by Classic Dyestuffs Inc.).

A toner for electrostatic image development and an electrostatic image developer are prepared as in Example 8 except that any of the fluorescent colorant particle dispersions (4) to (7) is used instead of the fluorescent colorant particle dispersion (2).

Examples 13 and 14

Preparation of colorant particle dispersion (1)
Magenta pigment (FASTOGEN SUPER MAGENTA R, manufactured by DIC Corporation): 90 parts
Anionic surfactant (manufactured by DKS Co. Ltd., Neogen RK): 10 parts
Ion-exchange water: 200 parts The above materials are mixed and dispersed for 10 minutes by using a homogenizer (ULTRA-TURRAX T50, manufactured by IKA). Ion-exchange water is added such that the resulting dispersion has a solid content of 20% by mass to obtain a colorant particle dispersion (1) in which colorant particles having a volume-average particle size of 140 nm are dispersed.

A toner for electrostatic image development and an electrostatic image developer are prepared as in Example 8 except that the fluorescent colorant particle dispersion (6) and the colorant particle dispersion (1) are further used in the preparation of toner particles so as to have the mass ratio described in Table 1.

Example 15

A toner for electrostatic image development and an electrostatic image developer are prepared as in Example 8 except that the fluorescent colorant particle dispersion (6) is further used in the preparation of toner particles so as to have the mass ratio described in Table 1.

Example 16

Preparation of resin particle dispersion: Example of preparation of anionic particle by emulsion polymerization
Styrene (manufactured by FUJIFILM Wako Pure Chemical Corporation): 65.0 parts
n-Butyl acrylate (manufactured by FUJIFILM Wako Pure Chemical Corporation): 30.0 parts
Sodium p-styrenesulfonate (manufactured by Tosoh Corporation, SPINOMAR NaSS): 5.0 parts Cationic fluorescent colorant (manufactured by FUJIFILM Wako Pure Chemical Corporation, polymerizable dye, Reactive Dye Violet R13): 1.91 parts Anionic surfactant (manufactured by DKS Co. Ltd., Neogen RK): 1.0 part Anionic polymerization initiator (ammonium persulfate): 1.0 part DIW: 400 parts The above materials are mixed in a flask and emulsified for 10 minutes by using a homogenizer (ULTRA-TURRAX T50, manufactured by IKA). Next, the inside of the flask is purged with nitrogen, the flask is then heated in a water bath until the temperature reaches 85° C. while the solution in the flask is stirred, and, in this state, emulsion polymerization is performed for 5 hours. Subsequently, cooling is performed until the temperature decreases to 30° C. to obtain an anionic resin particle dispersion having a solid content of 20% by mass. A resin particle dispersion including resin particles having an average particle size of 180 nm is obtained.

A toner for electrostatic image development and an electrostatic image developer are prepared as in Example 6 except that the anionic resin particle dispersion prepared above is used instead of the fluorescent colorant particle dispersion (2).

Comparative Example 1

Solid matter prepared by washing the anionic binder resin particle dispersion (2) by dialysis, followed by drying: 85.5 parts Anionic dye (manufactured by Tokyo Chemical Industry Co; Ltd., Acid Red 52): 4.5 parts Paraffin wax (manufactured by NIPPON SEIRO CO., LTD., HNP-9): 10 parts The above components are mixed under heating (at 170° C. for 2 hours). The resulting mixture is coarsely pulverized with a Banbury mixer and further pulverized with an AFG100 mill (manufactured by HOSOKAWA MICRON CORPORATION) to obtain toner particles (C1). The toner particles (C1) have a volume-average particle size of 6.1 μm.

A toner for electrostatic image development and an electrostatic image developer are prepared as in Example 1 by using the toner particles (C1) obtained as described above.

The washing by dialysis is performed by placing the resin particle dispersion in a dialysis membrane, performing replacement by using deionized waster (DIW), and then freeze-drying the resulting dispersion.

Comparative Example 2

Toner particles (C1) of Comparative Example 1: 100 parts
Solid matter prepared by washing the anionic binder resin particle dispersion (2) by dialysis, followed by drying: 10 parts The above components are mixed in a NOBILTA 300 (manufactured by HOSOKAWA MICRON CORPORATION) to obtain toner particles (C2) coated with a shell layer. The toner particles (C2) have a volume-average particle size of 6.2 μm.

A toner for electrostatic image development and an electrostatic image developer are prepared as in Example 1 by using the toner particles (C2) obtained as described above.

Comparative Example 3

Solid matter prepared by washing the binder resin particle dispersion (1) by dialysis, followed by drying: 85.5 parts Cationic dye (manufactured by Taoka Chemical Co., Ltd., Rhodamine A): 4.5 parts Paraffin wax (manufactured by NIPPON SEIRO CO., LTD., HNP-9): 10 parts The above components are mixed under heating (at 170° C. for 2 hours). The resulting mixture is coarsely pulverized with a Banbury mixer and further pulverized with an AFG100 mill (manufactured by HOSOKAWA MICRON CORPORATION) to obtain toner particles (C3). The toner particles (C3) have a volume-average particle size of 6.1 μm.

A toner for electrostatic image development and an electrostatic image developer are prepared as in Example 1 by using the toner particles (C3) obtained as described above.

The washing by dialysis is performed by placing the resin particle dispersion in a dialysis membrane, performing replacement by using DIW, and then freeze-drying the resulting dispersion.

Comparative Example 4

Toner particles (C3) of Comparative Example 3: 100 parts
Solid matter prepared by washing the binder resin particle dispersion (1) by dialysis, followed by drying: 10 parts The above components are mixed in a NOBILTA 300 (manufactured by HOSOKAWA MICRON CORPORATION) to obtain toner particles (C4) coated with a shell layer. The toner particles (C4) have a volume-average particle size of 6.2 μm.

A toner for electrostatic image development and an electrostatic image developer are prepared as in Example 1 by using the toner particles (C4) obtained as described above.

Comparative Example 5

A toner for electrostatic image development and an electrostatic image developer are prepared as in Comparative Example 4 except that the amount of the cationic dye used is changed to the content of the fluorescent colorant described in Table 1.

Comparative Example 6

A toner for electrostatic image development and an electrostatic image developer are prepared as in Example 13 except that the amounts of the fluorescent colorant particle dispersion (2) and the colorant particle dispersion (1) are changed to the contents of the fluorescent colorant and the colorant described in Table 1.

Comparative Example 7

Method for preparing resin: Example of preparation of anionic particles by emulsion polymerization Methyl methacrylate (manufactured by FUJIFILM Wako Pure Chemical Corporation): 95.0 parts Sodium p-styrenesulfonate (manufactured by Tosoh Corporation, SPINOMAR NaSS): 5.0 parts Anionic surfactant (manufactured by DKS Co. Ltd., Neogen RK): 1.0 part Anionic polymerization initiator (ammonium persulfate): 1.0 part DIW: 400 parts The above materials are mixed in a flask and emulsified for 10 minutes by using a homogenizer (ULTRA-TURRAX T50, manufactured by IKA). Next, the inside of the flask is purged with nitrogen, the flask is then heated in a water bath until the temperature reaches 85° C. while the solution in the flask is stirred, and, in this state, emulsion polymerization is performed for 5 hours. Subsequently, cooling is performed until the temperature decreases to 30° C. to obtain an anionic resin particle dispersion having a solid content of 20% by mass. A resin particle dispersion including resin particles having an average particle size of 210 nm is obtained.

Impurities are removed by a dialysis membrane, and freeze-drying is performed to obtain a dry product (resin A).

Preparation of Dye-Colored Resin: Kneading-Pulverization
Resin A: 75 parts
Cationic dye (manufactured by Taoka Chemical Co., Ltd., Rhodamine A): 4.8 parts The above components are mixed under heating (at 170° C. for 2 hours). The resulting mixture is coarsely pulverized with a Banbury mixer and further pulverized with an AFG100 mill (manufactured by HOSOKAWA MICRON CORPORATION) until the pulverized particles have a size of 0.5 µm to obtain color resin particles.

Preparation of Fluorescent Colorant Particle Dispersion (8)
Color resin particles obtained above: 90 parts
Anionic surfactant (manufactured by DKS Co. Ltd., Neogen RK): 10 parts
Ion-exchange water: 200 parts The above materials are mixed and dispersed for 10 minutes by using a homogenizer (ULTRA-TURRAX T50, manufactured by IKA). Ion-exchange water is added such that the resulting dispersion has a solid content of 20% by mass to obtain a fluorescent colorant particle dispersion (8) in which fluorescent colorant particles having a volume-average particle size of 0.5 µm are dispersed.

A toner for electrostatic image development and an electrostatic image developer are prepared as in Example 4 except that the fluorescent colorant particle dispersion (2) is changed to the fluorescent colorant particle dispersion (8), and the amount of the fluorescent colorant is changed to the amount described in Table 1.

In the toner for electrostatic image development obtained in Comparative Example 7, the fluorescent colorant is not dispersed in the binder resin but is merely present in the particles of the polymethyl methacrylate copolymer.

Comparative Example 8

A toner for electrostatic image development and an electrostatic image developer are prepared as in Comparative Example 7 except that the amount of the fluorescent colorant is changed to the amount described in Table 1.

In the toner for electrostatic image development obtained in Comparative Example 8, the fluorescent colorant is not dispersed in the binder resin but is merely present in the particles of the polymethyl methacrylate copolymer.

The following evaluations are performed by using the toners for electrostatic image development and the electrostatic image developers obtained in Examples 1 to 16 and Comparative Examples 1 to 8. Table 1 summarizes the evaluation results.

Fluorescence Intensity Evaluation

The following operation and image formation are performed in an environment at a temperature of 23° C. and a humidity of 50% RH.

An image forming apparatus ApeosPort-IV C4470 manufactured by Fuji Xerox Co., Ltd. is prepared to form an image for evaluation. A developer is charged in a developing device, and a replenishment toner (a toner that is the same as the toner included in the developer) is charged in a toner cartridge. Subsequently, an image having a size of 5 cm×5 cm and having an image area ratio of 100% (image having an amount of toner per unit area of 4.5 g/m$^2$) is formed on OS coated paper manufactured by Fuji Xerox Co., Ltd. (basis weight: 127 g/m$^2$) and output at a fixing temperature of 170° C., and a fluorescence intensity evaluation is performed.

The fluorescence intensity is determined from the measurement of the spectral reflectance in the visible light region with an X-Rite (manufactured by X-Rite Inc.). The fluorescence peak intensity in the spectral reflectance is defined as the fluorescence intensity.

A: 112% or more
B: 108% or more and less than 112%
C: 104% or more and less than 108%
D: 100% or more and less than 104%
E: less than 100%

Evaluation of Graininess of Image (Color Noise)

An image for evaluation is prepared by outputting an image as in the fluorescence intensity evaluation except that the image output is changed to a halftone image having an image area ratio of 50%. The following graininess evaluation is performed.

The image quality is evaluated on the basis of an index called color noise (CN) that quantifies density unevenness at a pitch of 1 mm or less. Table 1 shows the results. The CN index quantifies the graininess, which is a sensory evaluation value. A lower CN index means better image quality.

A: The value of CN index is 3.0 or less.
B: The value of CN index is more than 3.0 and 3.5 or less.
C: The value of CN index is more than 3.5 and 4.0 or less.
D: The value of CN index is more than 4.0.

Rub Resistance Evaluation

An image for evaluation, the image being the same as the image for evaluation output in the graininess evaluation described above, is prepared. The following rub resistance evaluation is performed.

Unused OK Prince wood-free paper is placed on the image for evaluation. The surface of the fixed image is rubbed back and forth with the unused paper by using a surface property tester TriboGear 14DR (manufactured by Shinto Scientific Co., Ltd.) 10 times at a vertical load of 100 g and a rubbing rate of 10 mm/see with a rubbing stroke width of 2 cm. Contamination of the unused paper after rubbing is observed visually and with a loupe with a magnification of 50. The evaluation criteria are as follows.

A: No contamination due to the toner is observed.
B: No contamination due to the toner is visually observed. However, slight contamination is observed with the loupe.
C: Very slight contamination is visually observed.
D: Contamination is considerably visually observed.

| | Binder resin | | Amount of shell (%) | Amount of release agent (%) | Fluorescent colorant | | Amount (WA) % | Colorant | | WB/WA | Another component | |
|---|---|---|---|---|---|---|---|---|---|---|---|---|
| | Property | Type | Amount % | | | Property | Type | | Type | Amount (WB) (%) | | Type | Amount (%) |
| Example 1 | Cationic | St/Ac | 85.5 | 0 | 10 | Anionic | Acid Red 52 | 4.5 | — | — | — | — | — |
| Example 2 | Cationic | St/Ac | 75.9 | 10 | 10 | Anionic | Acid Red 52 | 4.1 | — | — | — | — | — |

-continued

| | | | | | | | | | | | | |
|---|---|---|---|---|---|---|---|---|---|---|---|---|
| Example 3 | Anionic | St/Ac | 85.5 | — | 10 | Cationic | Basic Violet 11:1 | 4.5 | — | — | — | — |
| Example 4 | Anionic | St/Ac | 75.9 | 10 | 10 | Cationic | Basic Violet 11:1 | 4.1 | — | — | — | — |
| Example 5 | Anionic | St/Ac | 77.2 | 10 | 10 | Cationic | Basic Violet 11:1 | 2.8 | — | — | — | — |
| Example 6 | Anionic | St/Ac | 78.5 | 10 | 10 | Cationic | Basic Violet 11:1 | 1.5 | — | — | — | — |
| Example 7 | Anionic | PES | 78.5 | — | 10 | Cationic | Basic Violet 11:1 | 1.5 | — | — | — | — |
| Example 8 | Anionic | PES | 78.5 | 10 | 10 | Cationic | Basic Violet 11:1 | 1.5 | — | — | — | — |
| Example 9 | Anionic | PES | 78.5 | 10 | 10 | Cationic | Basic Yellow 40 | 1.5 | — | — | — | — |
| Example 10 | Anionic | PES | 78.5 | 10 | 10 | Cationic | Basic Green 1 | 1.5 | — | — | — | — |
| Example 11 | Anionic | PES | 78.5 | 10 | 10 | Cationic | Basic Red 1:1 | 1.5 | — | — | — | — |
| Example 12 | Anionic | PES | 78.5 | 10 | 10 | Cationic | Basic Orange 15 | 1.5 | — | — | — | — |
| Example 13 | Anionic | PES | 77.4 | 10 | 10 | Cationic | Basic Violet 11:1<br>Basic Red 1:1 | 0.75<br>0.75 | PR122 | 1.1 | 0.73 | — |
| Example 14 | Anionic | PES | 78 | 10 | 10 | Cationic | Basic Violet 11:1<br>Basic Red 1:1 | 0.75<br>0.75 | PR122 | 0.5 | 0.33 | — |
| Example 15 | Anionic | PES | 78.5 | 10 | 10 | Cationic | Basic Violet 11:1<br>Basic Red 1:1 | 0.75<br>0.75 | — | — | — | — |
| Example 16 | Anionic | St/Ac | 78.5 | 10 | 10 | Covalent bond | Reactive Dye Violet R13 | 1.5 | — | — | — | — |
| Com. Ex. 1 | Anionic | St/Ac | 85.5 | — | 10 | Anionic | Acid Red 52 | 4.5 | — | — | — | — |
| Com. Ex. 2 | Anionic | St/Ac | 85.5 | 10 | 10 | Anionic | Acid Red 52 | 4.5 | — | — | — | — |
| Com. Ex. 3 | Cationic | St/Ac | 85.5 | — | 10 | Cationic | Basic Violet 11:1 | 4.5 | — | — | — | — |
| Com. Ex. 4 | Cationic | St/Ac | 85.5 | 10 | 10 | Cationic | Basic Violet 11:1 | 4.5 | — | — | — | — |
| Com. Ex. 5 | Cationic | St/Ac | 85.5 | 10 | 10 | Cationic | Basic Violet 11:1 | 5.5 | — | — | — | — |
| Com. Ex. 6 | Anionic | PES | 86 | 10 | 10 | Cationic | Basic Violet 11:1<br>Basic Red 1:1 | 1.9 | PR122 | 2.1 | 1.40 | — |
| Com. Ex. 7 | Anionic | St/Ac | 90 | 10 | 10 | *1 | Basic Violet 11:1 | 4.8 | — | — | PMMA | 15 |
| Com. Ex. 8 | Anionic | St/Ac | 90 | 10 | 10 | *1 | Basic Violet 11:1 | 4.8 | — | — | PMMA | 30 |

| | | | Evaluation results | | |
|---|---|---|---|---|---|
| | Type of chemical bond | Dispersion state of flourescent colorant | Shell layer | Fluorescence intensity (%) | Graininess | Rub resistance |
| Example 1 | Ionic bond | Molecular dispersion | Not formed | C | C | A |
| Example 2 | Ionic bond | Molecular dispersion | Formed | C | C | A |
| Example 3 | Ionic bond | Molecular dispersion | Not formed | C | B | B |
| Example 4 | Ionic bond | Molecular dispersion | Formed | C | A | B |
| Example 5 | Ionic bond | Molecular dispersion | Formed | B | A | B |
| Example 6 | Ionic bond | Molecular dispersion | Formed | A | A | B |
| Example 7 | Ionic bond | Molecular dispersion | Not formed | A | B | B |
| Example 8 | Ionic bond | Molecular dispersion | Formed | A | A | B |
| Example 9 | Ionic bond | Molecular dispersion | Formed | A | A | B |
| Example 10 | Ionic bond | Molecular dispersion | Formed | A | A | B |
| Example 11 | Ionic bond | Molecular dispersion | Formed | A | A | B |
| Example 12 | Ionic bond | Molecular dispersion | Formed | A | A | B |
| Example 13 | Ionic bond | Molecular dispersion | Formed | C | A | B |
| Example 14 | Ionic bond | Molecular dispersion | Formed | B | A | B |
| Example 15 | Ionic bond | Molecular dispersion | Formed | A | A | B |
| Example 16 | Covalent bond | Molecular dispersion | Formed | C | A | B |
| Com. Ex. 1 | None | Coarse dispersion | Not formed | D | D | A |
| Com. Ex. 2 | None | Coarse dispersion | Formed | D | C | A |
| Com. Ex. 3 | None | Coarse dispersion | Not formed | C | D | B |
| Com. Ex. 4 | None | Coarse dispersion | Formed | D | C | B |
| Com. Ex. 5 | Ionic bond | Molecular dispersion | Formed | D | B | B |
| Com. Ex. 6 | Ionic bond | Molecular dispersion | Formed | E | A | B |
| Com. Ex. 7 | Ionic bond | Molecular dispersion | Formed | E | A | C |
| Com. Ex. 8 | Ionic bond | Molecular dispersion | Formed | D | A | D |

Com. Ex.: Comparative Example

In Table 1, *1 means that the fluorescent colorant is not dispersed in the binder resin but is merely present in the particles of the polymethyl methacrylate copolymer.

The results in Table 1 show that the resin particles (toners for electrostatic image development) of Examples provide images having fluorescence intensities higher than those of images obtained by using the resin particles (toners for electrostatic image development) of Comparative Examples.

Furthermore, the results in Table 1 show that the images obtained by using the resin particles (toners for electrostatic image development) of Examples have reduced graininess and good rub resistance.

Example 17

Production of Coated Product

The resin particles of Example 1 are applied to a rectangular test panel formed of a zinc phosphate-treated steel sheet having a size of 10 cm×10 cm by using a corona gun manufactured by ASAHI SUNAC CORPORATION. Specifically, the resin particles are applied to the test panel at a distance 30 cm away from the front surface by sliding the corona gun in the horizontal and vertical directions so as to form a coating film having a thickness of 30 μm or more and 50 μm or less. The resulting test panel is then baked at 150° C. for 5 minutes to produce a coated product.

It is confirmed that, in the coated product produced as described above, the powder adheres to the product to be coated (zinc phosphate-treated steel sheet) and thus coating is performed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An electrostatic charge image developing toner, comprising:
   a toner particle including a fluorescent colorant and
   a binder resin,
   wherein the fluorescent colorant is molecularly dispersed in the binder resin in a monomolecular state,
   the glass transition temperature of the binder resin is 50° C. or higher and 90° C. or lower,
   the fluorescent colorant is bound to the binder resin by an ionic bond, and
   the volume-average particle size ($D_{50v}$) of the resin toner particles is 2 μm or more and 10 μm or less.

2. The resin particle according to claim 1, wherein the toner particle is a core-shell particle.

3. The resin particle according to claim 2, wherein the fluorescent colorant is not exposed at a surface of the toner particle.

4. The resin particle according to claim 2, wherein the fluorescent colorant is a fluorescent dye.

5. The resin particle according to claim 4, wherein the fluorescent dye has a maximum fluorescence wavelength in a wavelength range of from 580 nm to 650 nm.

6. The resin particle according to claim 1, wherein the fluorescent colorant is not exposed at a surface of the toner particle.

7. The resin particle according to claim 1, wherein the fluorescent colorant is a fluorescent dye.

8. The resin particle according to claim 7, wherein the fluorescent dye has a maximum fluorescence wavelength in a wavelength range of from 580 nm to 650 nm.

9. The resin particle according to claim 1, wherein the binder resin has an anionic group and the fluorescent colorant has a cationic group.

10. The resin particle according to claim 1, wherein the binder resin has a cationic group and the fluorescent colorant has an anionic group.

11. The resin particle according to claim 1, wherein the average circularity of the toner particle is 0.91 or more and 0.98 or less.

12. The resin particle according to claim 1, wherein based on the total mass of the fluorescent colorant included in the toner particle, 50% by mass or more of the fluorescent colorant is bound to the binder resin by a chemical bond.

13. The electrostatic charge image developing toner according to claim 1, wherein the toner particle further includes a colorant that does not exhibit fluorescence in a visible light region.

14. The electrostatic charge image developing toner according to claim 13, wherein the colorant comprises a pigment.

15. The electrostatic charge image developing toner according to claim 14, wherein a content of the fluorescent colorant in the toner particle is WA, a content of the colorant in the toner particle is WB, and a ratio (WB/WA) of the content of the colorant to the content of the fluorescent colorant in the toner particle is 0.33 or greater and 1.25 or less.

16. An electrostatic charge image developer comprising the electrostatic charge image developing toner according to claim 1.

17. An image forming apparatus comprising:
   an image carrier;
   a charging unit configured to charge a surface of the image carrier;
   an electrostatic charge image forming unit configured to form an electrostatic charge image on the surface of the image carrier charged;
   a developing unit that contains the electrostatic charge image developer according to claim 16, and is configured to develop the electrostatic charge image as a toner image by the electrostatic charge image developer;
   a transfer unit configured to transfer the toner image formed on the surface of the image carrier to a surface of a recording medium; and
   a fixing unit configured to fix the toner image transferred to the surface of the recording medium.

* * * * *